(12) United States Patent
Shinagawa et al.

(10) Patent No.: US 6,323,863 B1
(45) Date of Patent: Nov. 27, 2001

(54) OBJECT STRUCTURE GRAPH GENERATION AND DATA CONVERSION USING THE SAME

(75) Inventors: Yoshihisa Shinagawa; Kazuki Hirose, both of Tokyo (JP)

(73) Assignee: Monolith Co., Ltd., Tokyo (JP)

( * ) Notice: Subject to any disclaimer, the term of this patent is extended or adjusted under 35 U.S.C. 154(b) by 0 days.

(21) Appl. No.: 09/041,276

(22) Filed: Mar. 11, 1998

(30) Foreign Application Priority Data

Mar. 11, 1997 (JP) .................................................. 9-056414
Nov. 25, 1997 (JP) .................................................. 9-362413

(51) Int. Cl.[7] .................................................. G06T 11/20
(52) U.S. Cl. .................. 345/441; 345/619; 345/473; 345/440; 345/419; 345/420
(58) Field of Search ..................................... 345/440, 473, 345/433, 420, 419, 441

(56) References Cited

U.S. PATENT DOCUMENTS

| | | | | |
|---|---|---|---|---|
| 5,671,343 | * | 9/1997 | Kondo et al. | 345/419 |
| 5,909,218 | * | 6/1999 | Naka et al. | 345/419 |
| 5,912,675 | * | 6/1999 | Laperri'ere | 345/473 |
| 5,966,141 | * | 10/1999 | Ito et al. | 345/473 |

OTHER PUBLICATIONS

Shinagawa et al., "Constructing a Reeb Graph Automatically from Cross Sections", IEEE Computer Graphics & Applications, pp. 44–51, Nov. 1991.*

Kunii et al., "Research issues in modeling complex object shapes", IEEE Computer Graphics and Applications, pp. 80–83, Mar. 1994.*

Saha et al., "Detection of 3–D simple points for topology preserving transformations with application to thinning", IEEE Transactions on Pattern Analysis and Machine Intelligence, vol. 17, No. 10, pp. 1028–1032, Oct. 1994.*

Pudney, "Distance–based skeletonization of 3D images", IEEE TENCON–Digital Signal Processing Applications, pp. 209–214, 1996.*

Shinagawa et al., "Surface Coding Based on Morse Theory", IEEE Computer Graphics & Applications, pp. 66–78, Sep. 1991.*

* cited by examiner

*Primary Examiner*—Matthew Luu
*Assistant Examiner*—Motilewa Good-Johnson
(74) *Attorney, Agent, or Firm*—Fleshner & Kim, LLP

(57) ABSTRACT

Shape expressions in CAD or CG have often been carried out in polygon data. In polygon representations, the amount of data becomes very large if precision is pursued. Another shape representation utilizing the existing polygon data asset is proposed. Polygon data showing the shape of an object is first obtained. Topological information of the object is extracted from the polygon data. Based on the information, the polygon data is converted into topological data. The inversion is carried out upon necessity.

37 Claims, 31 Drawing Sheets

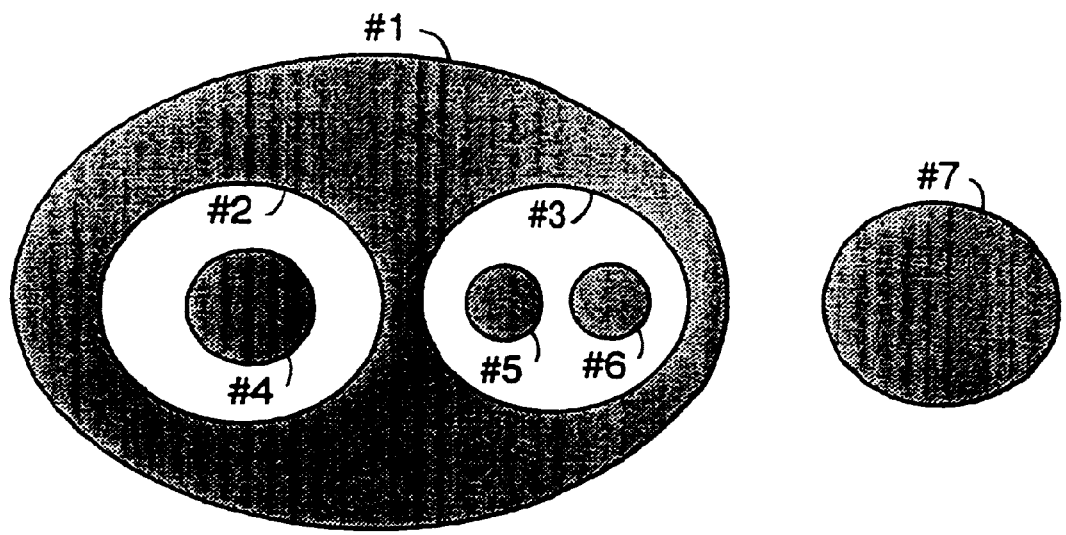
(a)
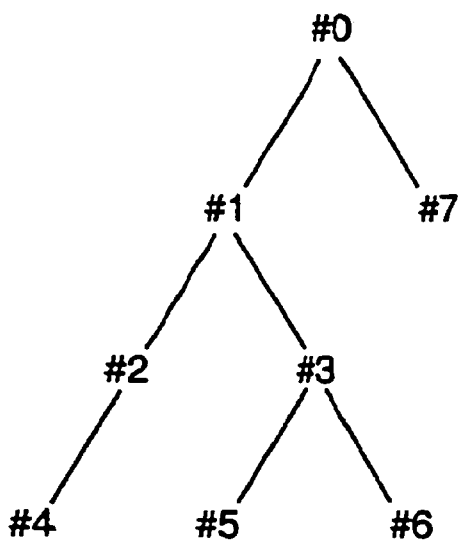
(b)
Fig. 4

```
program operators(input, output);
constant
            enabled = true;
            disabled = false;
            inside = true;
            outside = false;
            end_of_list = -1;
type
            contour_number = 0..max_contour_number;
            child_list = array[1..maxchildren] of contour_number;
            pointer_to_child_list = ↑ child_list;
var
            children: array[contour_number] of pointer_to_child_list;
            parent#: array[contour_number] of contour_number;
            number of children: array[contour_number] of integer;
            most_recently_created#: contour_number;
            contour_status: array[contour_number] of boolean;
```

FIG. 6

```
procedure add_listed_children(n:contour_number;clist:pointer_to_child_list);
            {details are omitted}
procedure remove_listed_children(n:contour_number;clist:pointer_to_child_list);
            {details are omitted}
function are_children(n:contour_number;clist:pointer_to_child_list):boolean;
            {details are omitted}
function in_list(n:contour_number;clist:pointer_to_child_list):boolean;
            {details are omitted}
function list_containing_only(n:contour_number):pointer_to_child_list;
    var     n_as_list: pointer_to_child_list;
    begin
            new(n_as_list);
            n_as_list ↑ [1]:= n;
            n_as_list ↑ [2]:= end_of_list;
            list_containing_only:= n_as_list;
    end;
```

FIG. 7 a
```
procedure put_e2(n: contour_number);
begin
    if (contour_status[n] = disabled) then go to error;
    create_new_contour;
    add_listed_children(n,list_containing_only(most_recently_created#));
end;
``` b
```
procedure put_e0(n: contour_number);
begin
    if ((contour_status[n] = disabled) or not all_successor_disabled(n))
        then goto error;
    contour_status[n]:= disabled;
end;
``` c
```
procedure put_e1_divide(n:contour_number); clist: pointer_to_child_list; inside:boolean);
begin
    if ((contour_status[n] = disabled) or (contour_status[parent#[n]]=disabled))
        then goto error;
    create_new_contour;
    add_listed_children(most_recently_created#, clist);
    if(not inside and are_children(parent#[n], clist)
        and not in_list(n, list)) or (clist = nil)) )
            then begin
                remove_listed_children(parent#[n], clist);
                add_listed_children(n,list_containing_only(most_recently_created#));
            end
    else if (inside and(are_children(n, clist) or (clist = nil)))
            then begin
                remove_listed_children(n, clist);
                add_listed_children(parent#[n],list_containing_only(most_recently_created#));
            end
    else go to error;
end;
``` d
```
procedure put_e1_merge(c1:contour_number; c2:contour_number);
begin
    if ((contour_status[c1] = disabled) or (contour_status[c2] = disabled))
        then goto error;
    if (c1 = parent#[c2]) then
        add_listed_children(parent#[c1], children[c2]);
    else if (parent#[c1] = parent#[c2] then
        add_listed_children(c1, children[c2]);
    else go to error;
    remove_listed_child(parent#[c2], list_containing_only(c2));
    contour_status[c2]:= disabled;
end;
```

FIG. 8

1. PUT_E2(0);
2. PUT_E2(1);
3. PUT_E1_DIVIDE(1, nil, INSIDE);
4. PUT_E1_DIVIDE(2, nil, INSIDE);
5. PUT_E2(2); PUT_E2(4);
6. PUT_E1_MERGE(1, 4);
7. PUT_E2(0);
8. PUT_E1_DIVIDE(3, list_containing_only(7), OUTSIDE);
9. PUT_E1_MERGE(3, 8); PUT_E0(7); PUT_E0(3);
10. PUT_E1_MERGE(1, 2);
11. PUT_E0(5);
12. PUT_E1_MERGE(1, 6);
13. PUT_E0(1);

FIG. 13

GUIDING CURVE

| NODES | N 1 | (x 1, y 1, z 1) / index1 |
|---|---|---|
| | N 2 | (x 2, y 2, z 2) / index2 |
| | ... | ... |
| EDGES | E 1 | (N 1, N 2) |
| | E 2 | (N 2, N 3) |
| | ... | ... |
| CONTOURS | C 1 | E 1 / C e q 1 / C 2 |
| | C 2 | N 2 / C e q 2 / C 1 |
| | ... | ... |
| GUIDING CURVES | G 1 | N 1 / Q 1 s / Q 1 t / N 4 |
| | G 2 | N 2 / Q 2 s / Q 2 t / N 4 |
| | ... | ... |

F I G. 3 8

OBJECT STRUCTURE GRAPH GENERATION AND DATA CONVERSION USING THE SAME

BACKGROUND OF THE INVENTION

1. Field of the Invention

The present invention relates to method and apparatus for generating a graph showing an object structure, and also to data converting method, apparatus, system, and data recording medium, all of which can use the graph generating method and apparatus. The present invention is applicable to CAD (Computer Aided Design) or to solid data used in CG (Computer Graphics), for example.

2. Description of the Related Art

For describing an object such as a solid in the field of CAD or CG, approximation using polygons has been known. This method divides the surface of an object into pieces and pastes polygon patches thereon. A large number of objects have been created in the form of polygon data and saved in databases or the like. Reasons why polygon expressions have become so popular are that this method is simple and easy to understand, and that any object can be covered with triangle patches by using this method, although editing procedure may require patience.

As has been pointed out for a long time, a problem in polygon expressions is that pursuit of precision is directly linked to an increase in data amount. Since polygon itself is flat, there is no effective method but to paste smaller polygons more when smoothness of a surface is pursued or a complex shape is expressed. For example, when a figure is modeled to a reasonable precision, tens or hundreds of thousands of polygons are generally needed. A user thinks that CG can create any image, since he/she has got used to amazing images in a movie made by using the state-of-the-art CG, such as in Jurassic Park or Apollo 13. When such a request by a user needs to be fulfilled, the number of polygons naturally increases, as long as the polygon expressions are used.

Remarkable progress in recent computer hardware lies in the background of the polygon number increase. In the past several years, improvements have been made in the areas of main memory capacity, secondary storage capacity, and CPU performance. Therefore, a large amount of polygon data can be dealt with. However, as communications using the Internet is getting popular, a problem has arisen that it takes a considerable amount of time to transfer a high-resolution image via a telephone line, and it has been widely recognized that the amount of image data is generally large. If larger polygon data is to be dealt with in the future, it will be necessary to improve hardware including infrastructure such as communication lines. There seems to be no end in the "rat race" between hardware and the number of polygons.

Based on considerations of the problems described above, a variety of trials have been carried out to reduce the amount of polygon data. In Japanese Patent Laid-Open Publication No. Hei 8-153211 (Apparatus for Reducing Polygons in Computer Graphics Data), an apparatus for reducing redundant polygons in response to viewpoints has been disclosed. According to this apparatus, image drawing speed can be increased while image quality is maintained. However, this apparatus does not reduce the amount of original polygon data needed to describe an object.

In Japanese Patent Laid-Open Publication No. Hei 7-262402 (Method for Surface Description), a method has been disclosed for expressing an object contour more smoothly by converting edges of polygons into arcs, with attention paid to directions of normal vectors at end points of the edges. When the number of polygons is small, the surface of an object is generally rough. The above method mitigates this drawback to some degree. However, this method is effective only for the cases where the number of original polygons is small, and does not reduce the polygon data amount itself.

Meanwhile, there exists another method for describing an object by surface elements called parametric patches. According to the parametric patch method, a surface can generally be expressed more smoothly with comparatively small data. On page 62 of "Basics and Applications of Three-dimensional CAD" (by Hiroshi Toritani and Hiroaki Chiyokura) published by Kyoritsu Shuppan Publishers Co., a method is disclosed for pasting surface patches by generating curve meshes using characteristic lines. In this textbook, explanation regarding how to describe surface patches by equations, how to make connections between the patches smooth, and how to describe irregular shape patches other than quadrilaterals are also given.

However, the greatest problem in using surface patches lies in the difficulties in automatic processing. If the shape to be dealt with is simple such as a cylinder, it would be easy to paste patches thereon. If the shape of an object is complex, it is extremely difficult to design a system which can give theoretical or logical support to, for example, how to approximately divide the object in order to paste patches successfully, or how to carry out minimal division. Therefore, an operator generally needs to manually specify how to paste or correct and pasting patches greatly depends on the operator's experience. On the other hand, if we hold on to the polygon expression giving up free-form surface patches, there will be no prospect of future improvement, with the amount of data to describe shapes being on the rise.

SUMMARY OF THE INVENTION

Based on observations of the reality described above, the present invention has been created to provide a representation method which replaces the existing polygon expressions.

Another object of the present invention is to provide a technique for converting polygon data into precise shape data suitable for free-form surface representation.

Still another object of the present invention is to provide a technique for uniquely and certainly converting polygon data into data in different representation, with logical support therefor.

Yet another object of the present invention is to provide a technique for generating data in representations different from the polygon expression.

Yet still another object of the present invention is to provide a technique for inverting shape data, which is represented in a smaller amount than that of polygon data, into polygon data upon necessity.

Still another object of the present invention is to provide a technique which utilizes assets of existing polygon data in an enormous amount when a shape expression different from polygon expressions is carried out.

Still another object of the present invention is to provide a technique for describing an object structure that is usable for realizing the data converting techniques.

In Japanese Patent Application No. Hei 9-303246, a technique is proposed which can model a complex object precisely and in a unique manner with a simple system such as a drawing tool. The present invention combines that technique and the conventional polygon expressions, and a primary object of the present invention is to revolutionize, in terms of quality, the shape expressions that use polygons.

A structure graph generating method of the present invention generates a skeleton graph of an object by extracting topological information or topology of the object from polygon data representing the shape of the object.

"The object" herein referred to anything that can be expressed in the form of n-dimensional data. The object may be a solid in CAD, temperature distribution, or the like. "Polygon data" include polygonal, mesh, polyhedron data and the like. "Topological information of an object" refers to information regarding the structure of an object. By the structure graph generating method of the present invention, information regarding the skeleton of an object can be obtained, which can be used for defining the shape of the object. A Reeb graph is an example of a skeleton graph, and it may be a classical one, or the one expressed by icons (described later) proposed by the applicants. In the latter case, the Reeb graph can deal with the internal structure of an object.

Another aspect of the present invention comprises the steps of obtaining polygon data representing an object shape, detecting singular points of a Morse function based on polygon data, and obtaining connection information between the singular points. A structure graph is described by singular points and connection information thereof.

A data converting method of the present invention first extracts topological information of an object from polygon data representing the shape of the object, and then converts the polygon data into topological data using the topological information (hereinafter, simply called "topological data"). In other words, the present invention converts polygon data representing an object shape into surface data by paying attention to topological structure of the object. The data after conversion is represented differently from the original polygon data, and the amount of the data depends on the definition of an optimized shape in the representation.

Still another aspect of the present invention comprises first obtaining topological data of an object, and then converting the data into polygon data noting description of the object in the data before conversion. The polygon data thus attained can be used in an apparatus capable of handling polygon data.

Yet another aspect of the present invention comprises the steps of obtaining polygon data representing an object shape, detecting singular points of a Morse function defined on the polygon data, obtaining connection information between the singular points, and obtaining contour information of a cross section of the object. Singular points and connection information thereof may form a skeleton graph. By adding contour information to the skeleton graph, an object shape may be defined.

Meanwhile, a structure graph generating apparatus of the present invention comprises a unit for inputting polygon data representing an object shape, and a skeleton graph generating unit for generating a skeleton graph of the object by extracting topological information of the object from the polygon data. A data converting apparatus of the present invention comprises a unit for obtaining contour information of a cross section of an object from the polygon data that have been input, as well as the above units included in the structure graph generating apparatus. However, it is not necessary for the skeleton graph generating unit to draw a skeleton graph uniquely, and the skeleton graph generating unit only have to collect information necessary for generating a skeleton graph.

A data transforming apparatus of the present invention comprises a unit for inputting topological data using topological information of an object, and a unit for converting the data into polygon data by paying attention to description of the object in the data. When topological data already exists, the data can be inverted into polygon data.

A data transforming system of the present invention comprises a unit for converting polygon data representing an object shape into topological data, and a unit for storing data resulted from the conversion. To inversely convert the thus obtained data into polygon data, this system further comprises a unit which read the stored data and inversely convert the data into polygon data by analyzing the structure of the data. Topological data is suitable for data storage and transfer, and the data is inversely converted into polygon data upon necessity.

BRIEF DESCRIPTION OF THE DRAWINGS

FIG. 4a shows the parent-child relation of contours and FIG. 4b shows the tree structure of contours having a parent-child relation;

FIG. 6 shows an example of programming operators in pseudo-Pascal code;

FIG. 7 shows an example of programming operators in pseudo-Pascal code;

FIG. 8 shows an example of programming operators in pseudo-Pascal code;

FIG. 13 is a list of operators for constructing the object shown in FIG. 11;

FIG. 38 shows a data configuration of core information;

DESCRIPTION OF THE PREFERRED EMBODIMENTS

Figure 1:
FIG. 1 shows the relation among indices of singularities, k-cells, and objects to be coded with them.

It is useful to introduce a dissertation written by one of the inventors as "premised techniques" for the sake of better understanding of the present invention. These "premised techniques" are based on the dissertation by Dr. Yoshihisa Shinagawa of Tokyo University, in 1993. Hereinafter, premised techniques are first quoted and preferred embodiments of the present invention are sequentially described referring to the premised techniques with necessary modifications and expansion added thereto.

Premised Techniques
[I] Surface Coding Based on Morse Theory
(1) Introduction

The shape of a solid or a surface in 3D space is generally represented as a sequence of symbols for coding. Coding herein referred to represent an object by using information necessary for modeling. In the case of natural objects, a shape can have so many degrees of freedom that coding them demands certain simplification. Topology is a mathematical means for performing such simplifications.

The present system interprets 3D objects by using Morse theory in topology as a mathematical tool. As will be described later, object modeling can be carried out extremely effectively and without a contradiction by using this theory. However, Morse theory alone is not sufficient for precise 3D surface coding. The following explains the reasons for this, and describes an effort to solve that problem by developing some effective extensions to Morse theory.

(2) Classical Morse theory

Morse theory was primarily motivated by the calculus of variations, where the problem is describing the minima of the functional on an infinite dimensional space of paths. Conversely, one can also use the minima of a functional to describe some topological features of spaces that are otherwise hardly describable. The following is a brief look at Morse theory.

(a) Differentiable Manifolds

The spaces to which Morse theory can be applied are differentiable manifolds. Finite dimensional manifolds will next be considered.

Given an integer n, an n-dimensional manifold is a topological space such that any point has a neighborhood that can be mapped, one-to-one and bi-continuously, on a subset of the n-dimensional space $R^n$. Such a mapping is called a chart and provides coordinates for the points in its domain, which correspond to latitude and longitude in the case of the globe. For the manifolds to be p times differentiable, the transformation from one coordinate system to another should also be p times differentiable for points in the range of two different charts.

One can thus see a manifold as being made of pieces of $R^n$ overlapping in a differentiable way. For instance, a line and a circle can be given with structures of 1-dimensional manifolds, and the surface of a sphere can be made a 2-manifold using at least two charts. One can make the surface of a torus a 2-manifold using at least four charts. Removing knotted circles from $R^3$ gives examples of 3-manifolds.

(b) Differentiable Mapping and Singularities

Using charts, mapping from a p-manifold to an n-manifold can be numerically expressed as mapping from pieces of $R^p$ to pieces of $R^n$. For this mapping, one can check differentiability: A mapping is of class $C^k$ if its components are k times continuously differentiable.

Let's define a height function on coordinates, which returns the height of a given point (such as z-coordinate of an object embedded in 3D-space). Jacobian matrix of a height function h: $R^2 \to R$ is given as $$J = \begin{pmatrix} \frac{\partial h}{\partial x_1} \\ \frac{\partial h}{\partial x_2} \end{pmatrix}$$

One can compute a Jacobian matrix at each point. Its rank is at most min(n, p). Points at which the rank of the Jacobian matrix reaches this maximal value are called "regular points", while the others are called "singular points" or "critical points". Singular points concerning the height function include "peak points", "saddle points" and "pits". In other words, at singular points, the vector of Jacobian matrix becomes zero, and the normal vector is oriented to the same direction as that of height.

(c) Hessian Matrix and Index

For a mapping from an n-manifold to R (we call such mapping "functions on a manifold"), a point is critical if and only if all partial derivatives are null. At such a point the aforementioned function is thus approximated by a quadratic form based on second order partial derivatives, the matrix of which is called the Hessian matrix, and its components are described as follows.

$$h = \begin{pmatrix} \frac{\partial^2 f}{\partial x_1^2} & \frac{\partial^2 f}{\partial x_1 \partial x_2} & \cdots & \frac{\partial^2 f}{\partial x_1 \partial x_n} \\ \frac{\partial^2 f}{\partial x_1 \partial x_2} & \frac{\partial^2 f}{\partial x_2^2} & \cdots & \frac{\partial^2 f}{\partial x_2 \partial x_n} \\ \cdots & \cdots & \cdots & \cdots \\ \frac{\partial^2 f}{\partial x_n \partial x_1} & \frac{\partial^2 f}{\partial x_n \partial x_2} & \cdots & \frac{\partial^2 f}{\partial x_n^2} \end{pmatrix}$$

Figure 3:
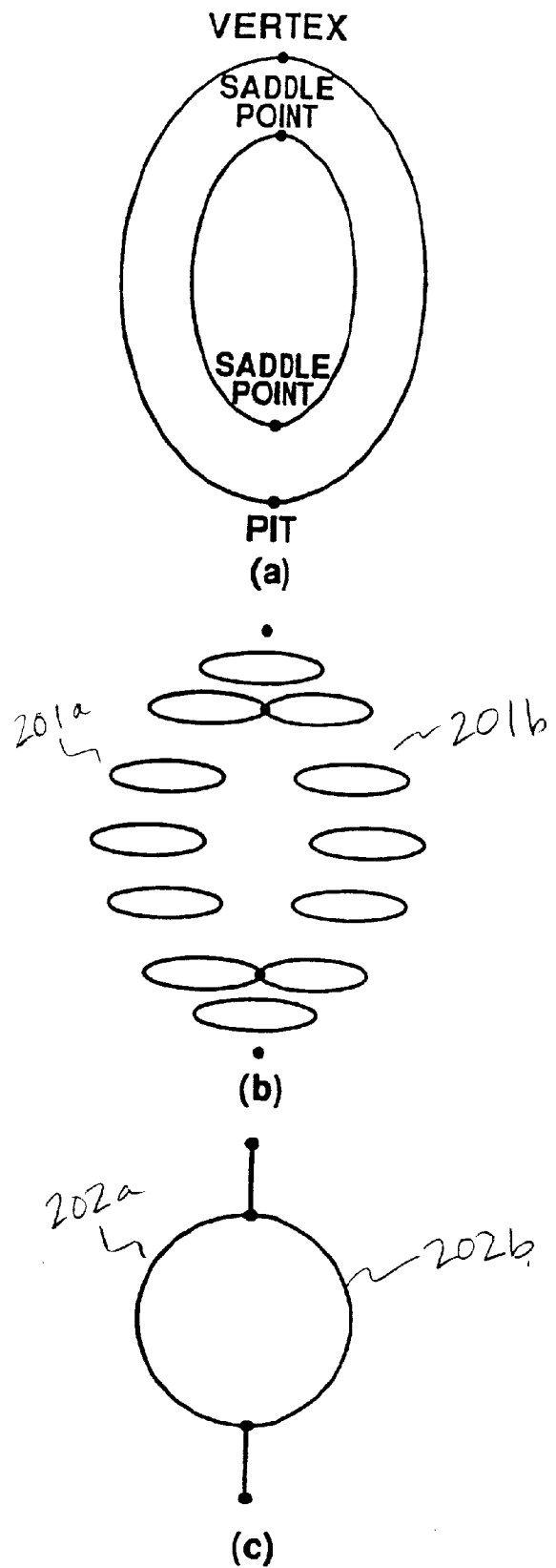
FIGS. 3a,3b,3c show the relation between a torus and its Reeb graph.
Figure 5:
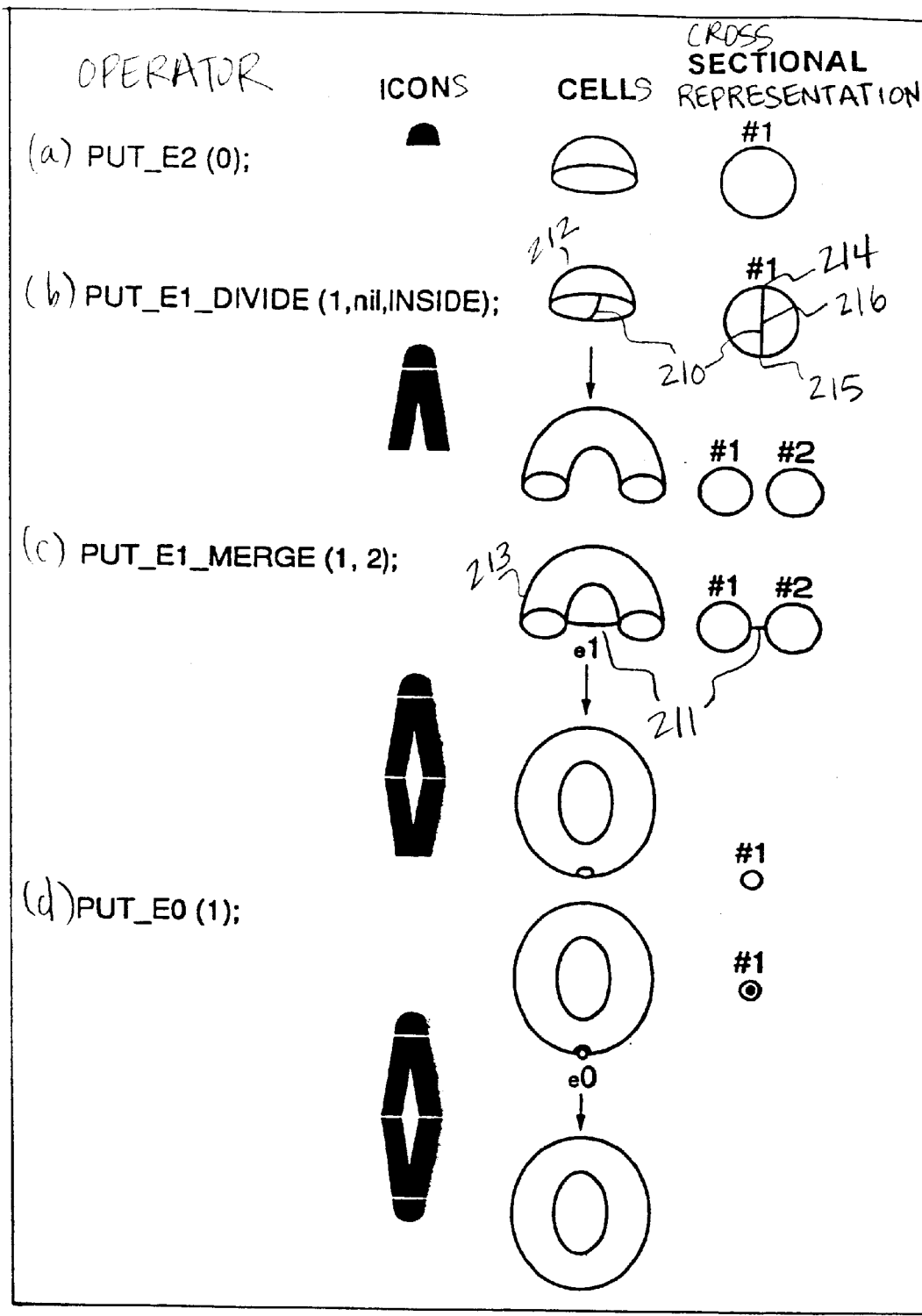
FIG. 5 is a diagram for explaining a method for encoding a torus using operators.

The number of negative definite of Hessian matrix at the singular point is called the index of the singularity. As shown in FIG. 1 below, the index is also equal to the number of minus signs in the reduced form. Indices of peak point, saddle point and pit are 2, 1 and 0, respectively. As shown in FIGS. 3a–3c, a torus has one, two and one critical points having indices 2, 1 and 0, respectively.

A singularity is not degenerate if the Hessian matrix has rank n at that critical point, and it is then called "non-degenerate". Any $C^2$ function can be approximated by a Morse function. A function on a manifold is called a Morse function if none of the singularities are degenerate. Therefore, the critical points of a Morse function are isolated, so for a compact manifold, only a finite number of them exist.

(D) Homotopy Types

Given a manifold and a Morse function on it and knowing the sequence of the indices of that function's singularities, Morse theory shows that a topological space with the same homotopy type as the manifold can be constructed as a cell complex after a sequence of operations corresponding to the singularities of the Morse function.

For any real number representing a height, a cell is a model for the part of the manifold whose points are below that height. As R is scanned from top to bottom, the topology of the complex does not change between two successive singular points, but each time a singular point is crossed, the cell complex is updated by attaching a k-cell to the former complex, where k is the index of the singularity. In brief, the shape of an object can be retrieved by attaching cells with the same dimensions as those of critical points.

FIG. 1 shows the relationship among indices of singularities, k-cells and an object to be coded by them. Here, the object is bound by a torus. A shown in FIG. 1, each time the threshold crosses critical heights, the topology of the set of points below the threshold changes. This change is topologically equivalent to attaching a k-cell. As shown in this Figure, 2-cell (k=2), I-cell (k=1), and 0-cell (k=0) can be represented by shapes such as a bowl laid upside down, a string, or a single point, respectively. Attaching those cells to build a cell complex followed by transforming it as in clay works can retrieve shape of the original object. In the case of a torus, it can be built by attaching one 2-cell, two 1-cells, and one 0-cell.

Figure 2:
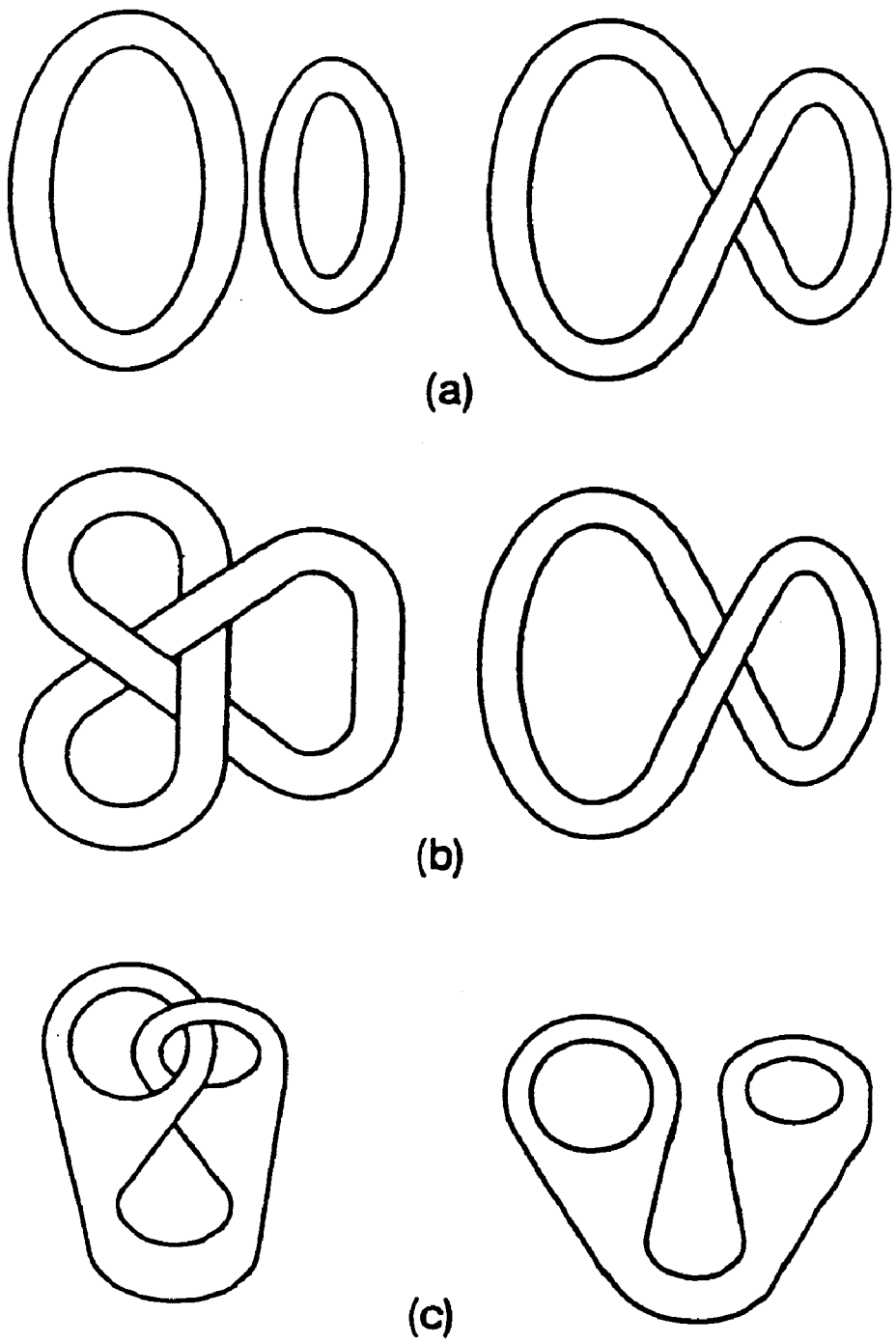
FIGS. 2a,2b,2c show three pairs of surfaces with the same sequence of Morse indices.

Note that the mere sequence of indices does not completely describe the cell complex. FIGS. 2a–2c show three pairs of surfaces with the same sequences of Morse indices, respectively. Thus, only with the sequence of indices, the cell complex cannot be completely determined. Therefore, one must know which connected components of the cross section will be involved in attaching each cell.

G. Reeb proposed considering a graph obtained from the manifold as a topological quotient space. The Reeb graph is to represent the mutual relationship of singularities, and is obtained by representing the object's surface with contour lines and representing the connected components of each contour with a single point. He did this by identifying in the manifold (assumed to be compact) all the points that have the same value under the Morse function and that are in the same connected component as the corresponding cross section. The connected components of the part of the manifold situated strictly between two critical levels are thus represented by separate line segments, which may be referred to as the edges of the graph. Each singularity corresponds to a vertex of the graph. The Reeb graph can be said to be a graph representing the skeleton of an object.

FIGS. 3a–3c show the relationship between a torus and the Reeb graph. FIG. 3a shows an original torus, FIG. 3b its cross sections and FIG. 3c its Reeb graph, respectively. Disjointed cross-sectional circles on the same plane in FIG. 3b such as 201a and 201b correspond to the two separate edges 202a and 202b in FIG. 3c. The Reeb graph may be used as icon representations, as described later in this specification.

(3) Limits of the Theory

Importantly, using Morse theory in this classical way permits only the recovery of the manifold's intrinsic topological properties. The sequence of indices does not code the way the manifold is embedded in space. For instance, one cannot determine whether an embedded torus is knotted in space, since both possible configurations can lead to the same singularities, as shown in FIG. 2b. The existence of links (shown in FIG. 2c) is another feature overlooked by simple Morse coding.

(4) Extending Morse Coding

This section is restricted to the case of surfaces associated with compact 2-manifolds of class $C^2$ (that are $C^2$ embedded in 3D space). It is desired that this Morse function on the surface to be induced by a height function in space. In fact, it is actually sufficient to slightly rotate a $C^2$ surface to have singularities become non-degenerate, thereby enabling its height function to become Morse.

Morse theory also states that between two critical levels (a critical level being the height of a plane containing a critical point) the topological type of the section does riot change. Thus, a number of bent cylinders can be used to model the surface between two such levels, which can be used for the system of the present invention.

Since nonsingular cross sections are made of circles embedded in a plane, the possible nested configuration call for hierarchical and structural coding-grouping plural circles that are contained in the same circle.

Besides information relative to the Reeb graph (that is, on how vertices are connected to each other), an extended coding is proposed which adds more information to the Morse index—information about the way cylinders are exchanged and turn around each other between two successive critical values.

(5) Coding System Example

The prototype coding system will next be explained. This system describes a surface by attaching k-cells to it and tracking the changes in the hierarchical structure of contours on cross-sectional planes. Operators are introduced to describe the attachment of cells and to code the surface. The iconic representation of cells attached by the operators enables easy understanding of the structure of the surface to be coded.

The major advantage of this coding system is that the topological integrity is guaranteed by the resulting code.

(a) Contours with Present-child Relations

The method for representing the hierarchical structure of contours will next be described. Here, a tree structure is used.

When a contour contains another contour, the former is called the parent contour of the latter and the latter is called the child contour of the former. FIGS. 4a and 4b show the present-child relation of contours (i.e. the contour structure) and the corresponding tree structure representation, respectively. The parent-child relation can be nested, as shown in FIG. 4a. In the following, for example, contour Number 1 is abbreviated as #1. It is the parent contour of #2, which in turn is the parent contour of #4. For convenience, contours that have no parents, such as #1 and #7, are described as the child contours of "virtual contour #0". Therefore, #0 comes to the top of the tree structure in FIG. 4(b).

We define an array "parent #[ ]" to represent the parent of the given contour. In the example above, parent#[1]=0 means that the parent of #1 is #0. On the other hand, the child contours of a contour are listed in an array "children," in which pointers to child contours are contained. For example, the pointers to the child contours of #3 is contained in children[3] and the child contours #5 and #6 are represented as children [3]↑[1]=5 and children [3]↑[2]=6.

For convenience, contours having the same parent contours are called sibling contours. In FIG. 4a, #2 and #3 are sibling contours. The parent's parent contour is called the grandparent contour and a child's child contour is called a grandchild contour. Also, a contour in the interior of which the object exists is called a solid contour, and a contour in the interior of which the object does not exist is called a hollow contour. In FIG. 4a, #1, #4, #5, #6, and #7 are solid contours, while #2 and #3 are hollow contours.

(b) Operators for Attaching Cells

There are defined four operators: Put_e0, Put_e1_merge, Put_e1_divide, and Put_e2. These paste the cells. In what follows, a k-cell is abbreviated as $e^k$.

Construction proceeds from the top to the bottom of an object. The process ends when it is not longer possible to attach cells. The contour structure on the cross-sectional planes is used to represent the status of the surface that the operators are constructing.

FIGS. 5a–d show methods for constructing a torus using these operators. In the following, functions of the operators will be described with reference to this Figure.

First, the operator Put_e2(0) is used to create a cell $e^2$ as shown in FIG. 5a. The parameter "0" of Put_e2(0) means that contour #1 is created inside contour #0, which is the virtual contour. The cross section of this cell is shown under "Cross sectional representation" in the same Figure. As shown in FIG. 5a, Put_e2 functions to create a contour on a cross-sectional plane. All the contours the operators create are numbered in the order in which they are created. The contour created by Put_e2(0) is #1.

The status of a newly created contour is always "enabled" at first. This means that cells can be attached to the contour. We show our iconic representation of the cell $e^2$ under "Icon" in FIG. 5a.

Second, a cell $e^1$ is pasted to $e^2$ by the operator Put_e1_divide (1, nil, inside) (FIG. 5b. A newly created contour is numbered as #2. The third parameter of the operator, "inside," indicates that #2 is created as the child contour of parent #[1]=0, which is the virtual contour. the second parameter is the list of child contours to be referred. In this case, the second parameter is "nil", which indicates that no operation is performed toward child contour, and in particular, no child contour is to be removed.

Third, another $e^1$ is pasted to merge contours #1 and #2 by the operator Put_e_merge (1,2) (FIG. 5c). This operator merges the two contours designated by the first and second parameters into the first contour. Since the contour indicated by the second parameter disappears after the merge, the second contour is removed from the list of child contours of its parent contour. The status of the second contour is changed from "enabled" to "disabled". Therefore, no more cells can be attached to this contour Finally, Put_e(1) eliminates contour #1 by pasting $e^0$ (FIG. 5d). The status of contour #1 is changed from "enabled" to "disabled". The icon reflects this change. Note that when a contour is attached to a cell $e^0$, all of its child contours, if any, have to be disabled beforehand.

By these procedures described above, the attachment of cells with operators ends here because no enabled contours remain.

FIGS. 6–8 show examples of operator programs in pseudo-Pascal code. Max_children and Max_contour_number are defined as sufficiently large positive integers. They are used only for the implementation needs of memory allocation.

In FIG. 6, Number_of_children shows the number of child contours for each contour. Most recently-created# shows the most recently created contour number. Contours_status shows whether each contour is enable or disabled. Children gives the pointer to the array Child_list that contains the list of the child contours of a given contour. The constant End_of_list shows the end of Child_list. These variables are initialized as follows:

```
most_recently_created#: = 0;
for i: = 0 to max_contour_number do
    number_of_children [i]: 0;
for i: = 0 to max_contour_number do
    contour_status [i]: = disabled;
    contour_status [0]: = enabled;
```

Thus, the virtual contour here is enabled. Next, create_new_contour creates a new contour, increases most recently_created#, and initializes the status of the new contour.

Procedure create_new_contour;
begin
  most_recently_created#:=most_recently_created#+1;
  contour_status[most_recently_created#]:=enabled;
end In FIG. 7, we define two procedures and three functions for later use.

Add_listed_children adds the contours listed in the second parameter clist to the list of the child contours (children [n]↑) of the first parameter. Remove_listed_children removes the contours listed in the second parameter clist from the list of the child contours (children [n]↑) of the first parameter. These two procedures also update the array Number_of_children and Parent#.

The function Add_children (n, clist) returns "true" when all the contours in clist are child contours of #n. Otherwise it returns "false". The function In_list (n, clist) returns "true" when clist includes #n. Otherwise it returns "false". The function List_containing_only_(n) is defined to make a list containing only one contour to be fed to the procedures Add_listed_children and Remove_listed_children.

The four operators Put_e2, Put_e0, Put_1_divide, and Put_e1_merge can now be defined. They are shown in FIG. 8.

1. Put_e2(n) creates a new contour as the child contour of #n.

2. Put_e0(n) eliminates #n by attaching $e^0$. Here, All_successors_disabled (n, contour_number) returns "true" if and only if all the successors of #n are disabled.

3. Put_e1_divide (n, clist, inside) divides #n to create a new contour. The contours listed in clist become the child contours of the newly created contour. They are removed from the list of the child contours #r where either #r=#n or #r=parent#[n] holds, depending on whether they have been the child contours of #n or parent#[n]. Only these two cases are permitted.

4. Put_e1_merge (c1, c2) merges #c2 into #c1. #c2 is removed from the list of child contours of parent#[c2]. All the child contours of #c2 become the child contours of parent#[c1] or #c1, depending on whether #c1 is the parent or the sibling contour of #c2. Only these two cases are permitted.

To help understand the structure of the surface being coded by these operators, we propose graphic representations of the cells that constitute the Reeb graph of the surface.

Figure 9:
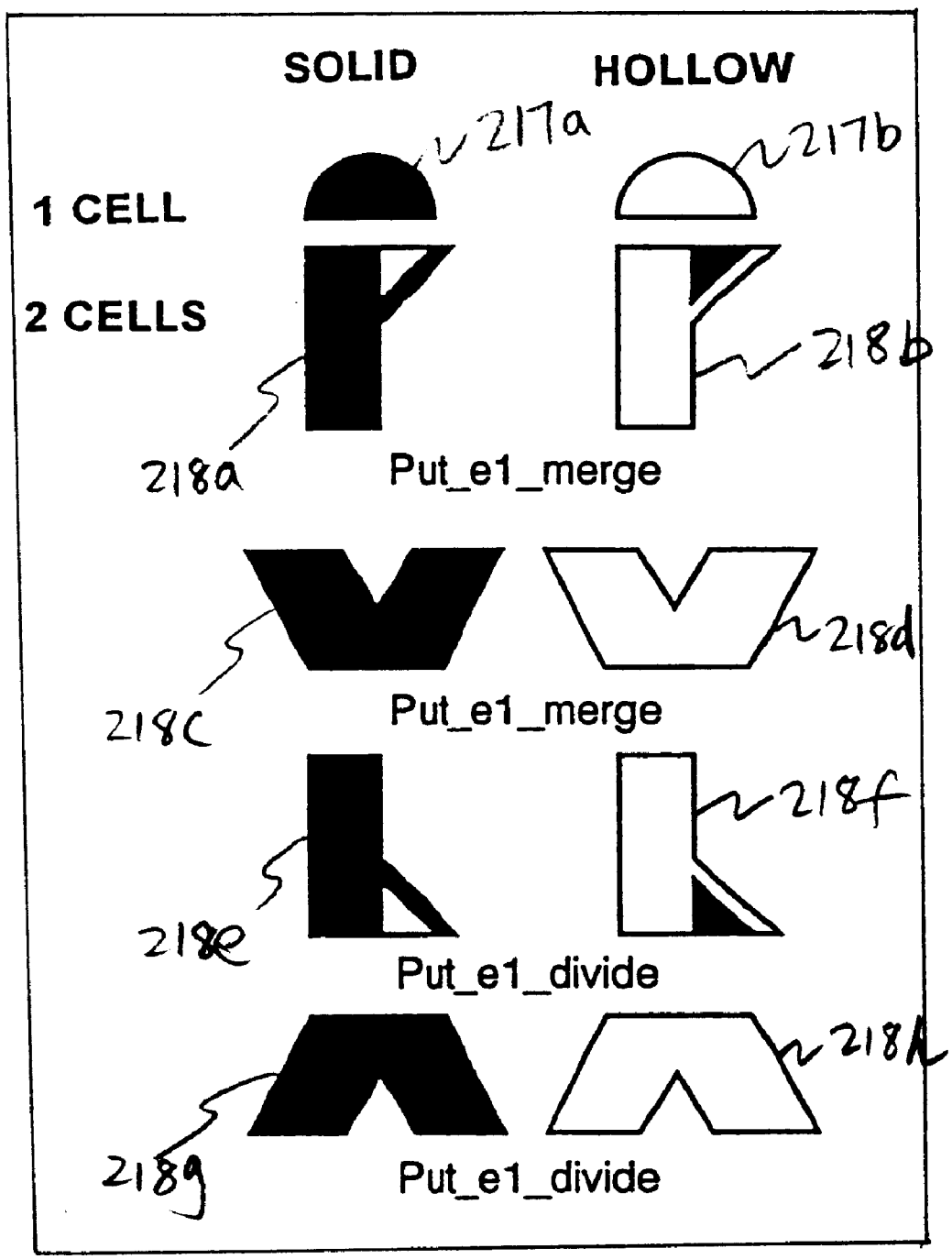
FIG. 9 shows icons corresponding to cells.
Figure 10:
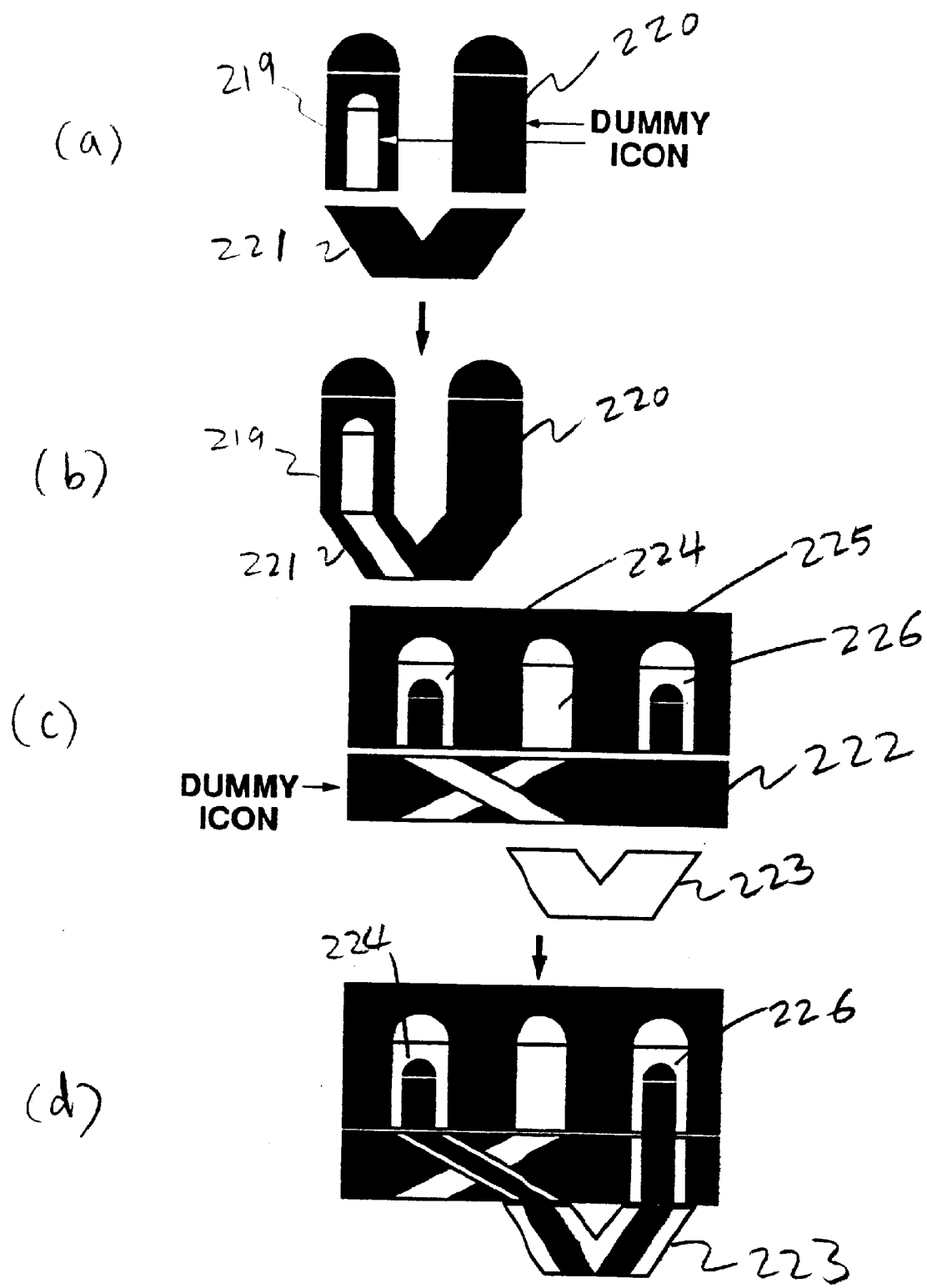
FIGS. 10(a)–(d) show the pasting of cells.

Each icon depicted in FIG. 9 represents either one cell (icons 217a, 217b) or two cells related to each other through an operator (icons 218a–218h). Two cells may be pasted by coinciding the flat top of one cell with the flat bottom of the other. The cells for hollow contours are depicted with white (open) icons and cells for solid contours with black (solid) icons. For $e^1$, various types of icons may be used, as shown in FIG. 9 (e.g. 218a and 218c, and 218e and 218g).

FIGS. 10(a)–(d) show the attachment or pasting of cells. The icons for child contours are drawn inside of the icons for their parent contours, as shown in Figure. Mirror images of the icons on the vertical axis are also allowed.

Icons are characteristic in that they preserve the contour structure (i.e. the parent-child relationship) of the icons to which they are attached. For example, when $e^1$ is attached to the cells as shown in FIGS. 10(a) and 10(b), the icon 221 preserves the structure of the parent-child relation of the cells 219 and 220 to which it is attached.

Dummy icons are inserted where necessary to adjust the height of cells, as shown in FIGS. 10(c) and 10(d). Because the Reeb graph may not be a planar graph, we can use the dummy icon 222 to interchange the cells 224 and 225 so that $e^1$ 223 can be attached to cells 224 and 226 that are now adjacent to each other. The dummy icon 222 interchanges the cells together with their inner structure. To preserve the hierarchical contour structure, the dummy icons cannot exceed the bounds of the parent contour of the contour to which it is attached, nor intrude into other contours. For this reason, only sibling contours can be interchanged using dummy icons.

Figure 11:
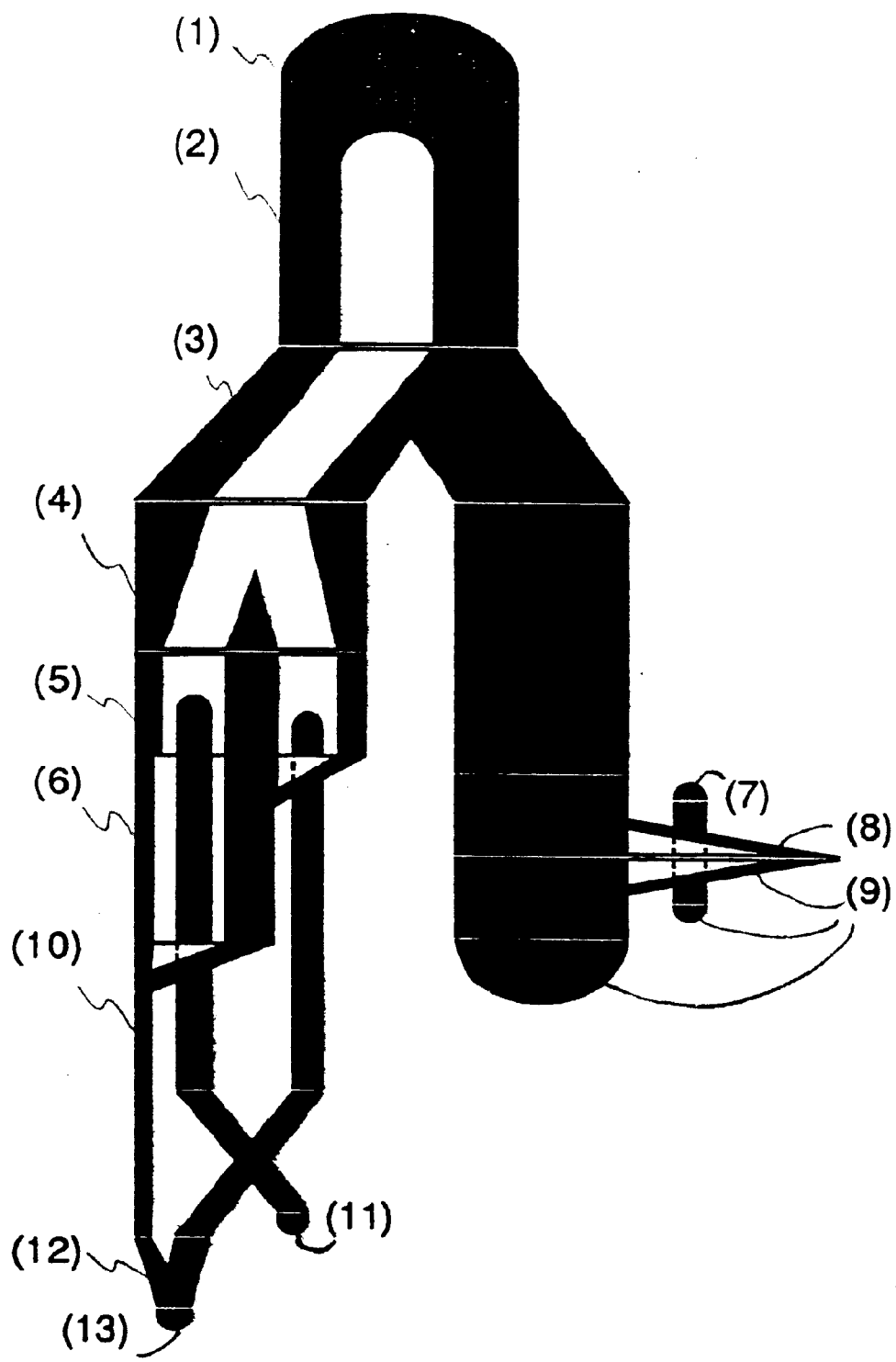
FIG. 11 shows an example of the Reeb graph of an object constructed with icons.
Figure 12:
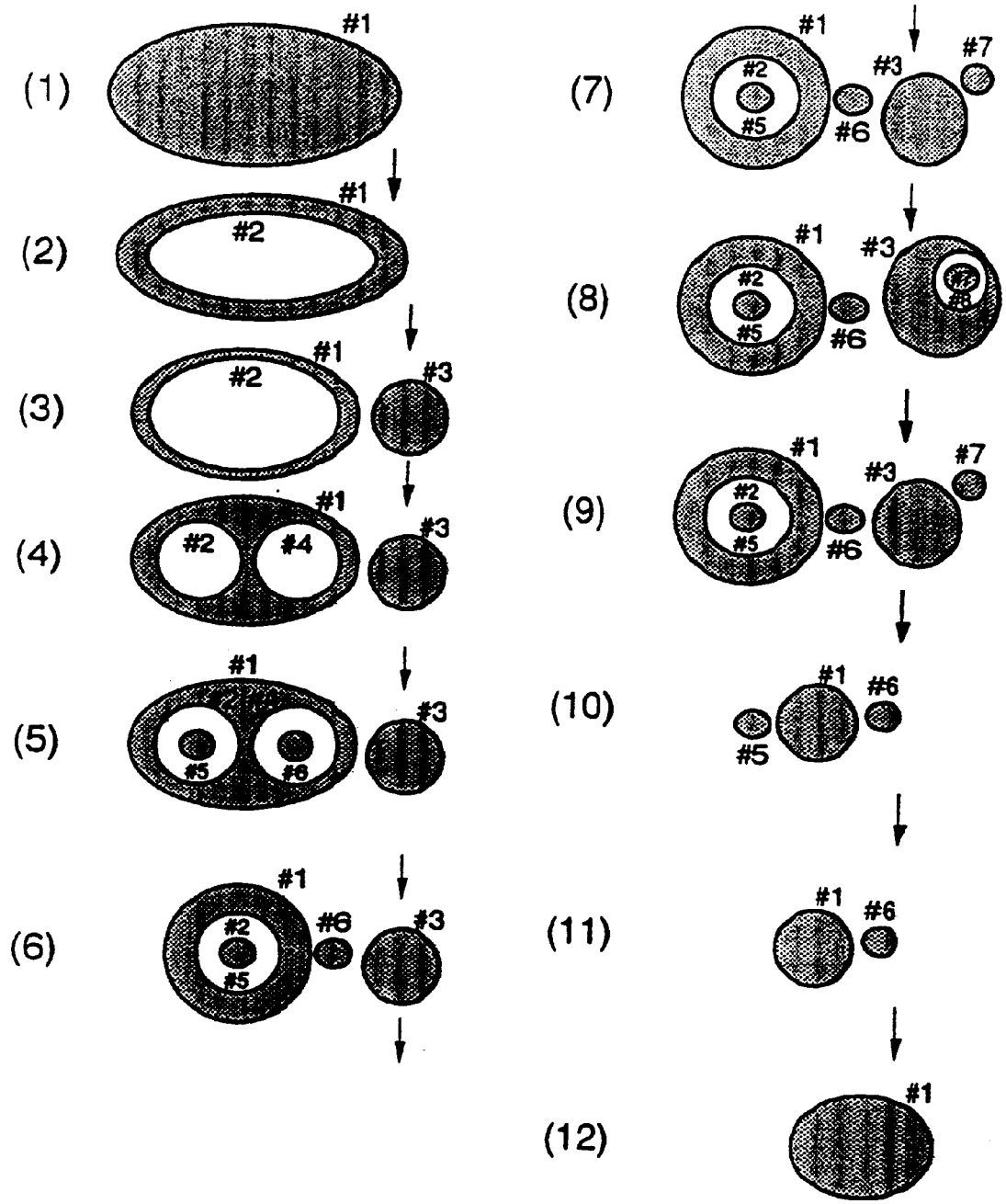
FIG. 12 shows the corresponding cross sectional contours of the object shown in FIG. 11.

FIGS. 11–13 illustrate an example of the code for constructing an object using the operators. FIG. 11 shows an example of constructing the Reeb graph of the object using icons (1) to (13). FIG. 12 shows the corresponding cross-sectional contours generated by icons (1) to (12). FIG. 13 lists the operators (1) to (13) corresponding to the icons for constructing the object.

[2] Surface Construction from Codes Using Operators (1) Surface generation as a locus of homotopy In this section surface is constructed from codes obtained by the previous method.

As was previously stated, the topology of a contour does not change between critical sections (i.e., sections containing critical points). When scanned from top to bottom, the shape of a contour changes. This transformation of a contour can be best represented by the notion of a homotopy. A homotopy transforms one function to another. In what follows, all the contours are represented by shape functions and the transformation are described by means of homotopies. The definition of homotopy is as given below.

Definition: Let f, g: X→Y be maps where X and Y are topological spaces. Then "f is homotopic to g" if there exists a map F: X x 1→Y such that F(x,0)=f(x) and F(x,1)=g(x) for all points x∈X.

Figure 14:
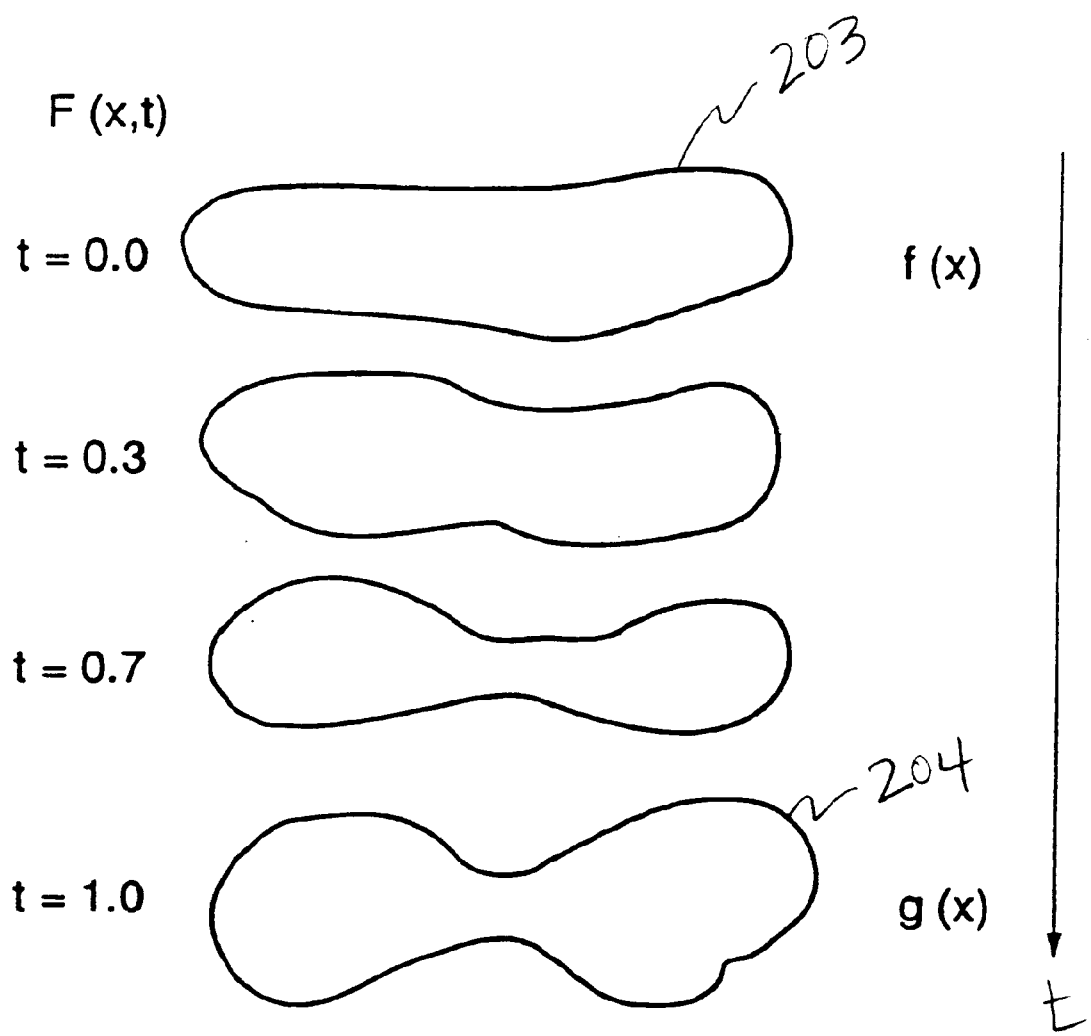
FIG. 14 shows a homotopic transformation of contours.

Here, I=[0,1]∈R. This map F is called "a homotopy from f to g". When F is defined by F(x, t)=(1−t)f(x)+t g(x), it is called a straight-line homotopy. In FIG. 14, a homotopic transformation of contours is shown. In this FIGURE, the upper contour 203 is represented by the shape function f and the lower contour 204 by g. The surface generated by moving the contour F(x,t) from t=0.0 to t=1.0 is the locus of the homotopy F from f to g.

(2) Elements for Implementing Operators

The operators that generate a surface as shown in FIGS. 5a–5d are described as transforming the contours by homotopies.

(a) Elements of the Operators

Figure 15:
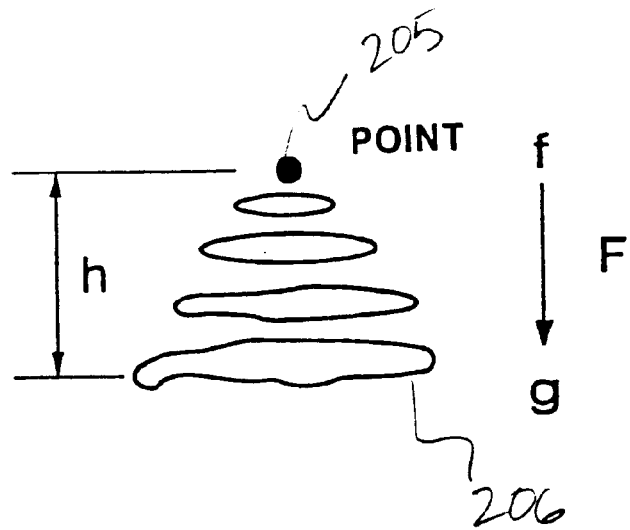
FIG. 15 shows four main parameters of an operator.

The following four main elements of the operators are described in FIG. 15.

(i) f: I→$R^3$ gives the shape of the upper contour 205

(ii) g: I→$R^3$ gives the shape of the lower contour 206

(iii) F: the homotopy from f to g (iv) h: the difference of the height between the two contours 205 and 206

(b) Shape Functions

The following shape functions f and g are provided.

(i) point: a constant function that always gives the location of a fixed point (ii) circle: give the shape of a circle (iii) polygon: gives the shape of a polygon that connects the given vertices (iv) Bézier: An n-dimensional Bézier curve is written as $$f(u) = \sum_{i=0}^{n} B_i^n(u) P_i \quad (0 \leq t \leq 1)$$

and specified by an ordered set of n points called the control points $P_i \in R^3$. Users can modify the control point. Here, $B^n_i(t)$ is a Bernstein basis function defined by $$B_i^n(u) = \binom{n}{i} u^i (1-u)^{n-i}.$$

(v) NURBS (Non Uniform Rational B-Spline) curves:
The control points of NURBS curves are also defined by users. A NURBS curve is defined by $$f(u) = \frac{\sum_{i=0}^{n} N_{i,k}(u) w_i P_i}{\sum_{i=0}^{n} N_{i,k}(u) w_i}$$

where $w_i$ is a weight associated with each control point. $N_{i,k}(u)$ is a piecewise polynomial of degree (k−1) called a B-spline basis function and defined as $$N_{i,1} = \begin{cases} 1 & (x_i \le u < x_{i+1}) \\ 0 & \text{otherwise} \end{cases}$$

$$N_{i,k}(u) = \frac{(u-x_i) N_{i,k-1}(u)}{x_{i+k} - x_i} + \frac{(x_{i+k+1} - u) N_{i+1,k-1}(u)}{x_{i+k+1} - x_{i+1}} \quad (2 \le k \le n+1).$$

NURBS is extensively used in a great number of CAD systems. It can represent a quadric surface accurately and has a local approximation property, that is, if a control point or the weight associated with it is changed, it affects the shape of the surface only in its neighborhood. Therefore, this fact is convenient for local deformation.

(c) Homotopy F

As the homotopy F, functions are provided as follows. They output cross sectional contours.

(i) linear: a straight-line homotopy (ii) quadrant:

quadrant: $F(x,t) = \text{quadrant}(x,t) = \sqrt{1-t^2} f(x) + (1-\sqrt{1-t^2}) g(x)$ (iii) parabola: $F(x,t) = (1-t^2) f(x) + t^2 g(x)$ (iv) cardinal spline: A cardinal spline interpolates the upper and lower contours.

Parameterization can be done automatically using a toroidal graph that indicates the correspondence between the contours.

(v) guiding curve: A contour is transformed by moving a point of the contour along a guiding curve. More than one guiding curve can be attached to a contour.

When a contour is represented by a Bézier or NURBS curve, the guiding curves are attached to the control points and the transformation is decided by the movement of the control points. The movement of a control point where a guiding curve is not attached can be computed using the guiding curves of its adjacent control points.

Figure 16:
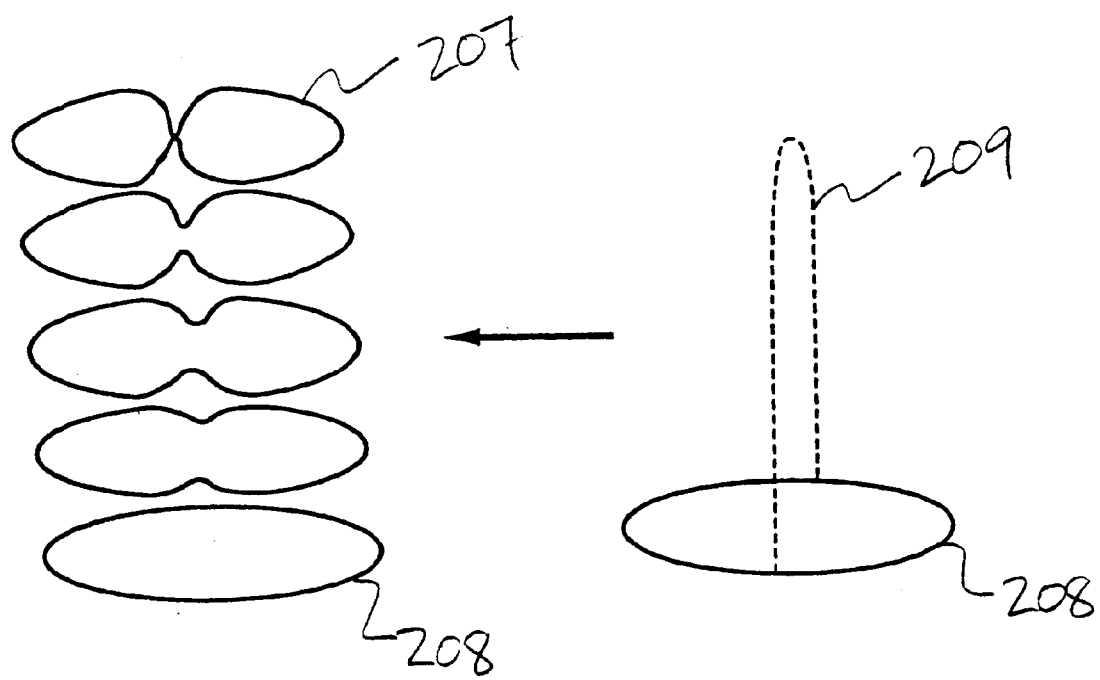
FIG. 16 shows gradual transformation of an upper contour into a lower one using a guiding curve.

FIG. 16 shows the gradual transformation of the upper contour 207 to the lower one 208 by attaching a guiding curve 209 to a contour (the lower contour 208 in this case) by the user.

In any case, surface patches are generated between the adjacent resulting contours using the cardinal spline.

(d) Shape Functions of Contours for the Operators

The shape functions of contours for the various operators shown in FIGS. 5a–5d are given below.

(i) For operator Put_e2 (FIG. 5a)
  f: point
  g: specified by users (default: circle)
  F: specified by users (default: quadrant)

(ii) For operator Put_e0 (FIG. 5d)
  f: the shape function of the contour to which the $e^0$ is attached
  g: point
  F: specified by users (default: quadrant)

(iii) For operators Put_e1_divide and Put_e1_merge (FIGS. 5b and 5c)

The path c of $e^1$: $[0, 1] \to R^3$ of $e^1$ must be decided. A path c(t) of a $e^1$ cell is for PUT_E1_DIVIDE operator is a curve which topologically indicates how to divide one contour to two contours. A path c(t) of a $e^1$ cell for PUT_E1_MERGE operator is a curve which topologically indicates how to merge two contours to one. FIGS. 5b and 5c show paths 210 and 211 for cells 212 and 213, respectively. In the implementation, the path c is specified by the locations of its two end points c(0) and c(1) and the mid-point c(½). The points c(0), c(1) and c(½) for the path 210 in FIG. 5b are indicated by numerals 214, 215 and 216, respectively in the cross-sectional representation. The path has to be smooth and its tangent vector at c(½) has to be parallel to the xy-plane so that c(½) becomes the saddle point of the generated surface. The default location of c(½) is at $$c(1/2) = \begin{pmatrix} \frac{c(0)_x + c(1)_x}{2} \\ \frac{c(0)_y + c(1)_y}{2} \\ c(0)_z - h \end{pmatrix}$$

where $$c(t) = \begin{pmatrix} c(t)_x \\ c(t)_y \\ c(t)_z \end{pmatrix}.$$

The default path is an arc of an ellipse connecting c(0) and c(1) given by $$c(t) = \begin{pmatrix} \left(1 - \sqrt{1-(2t)^2}\right) c(0)_x + \sqrt{1-(2t)^2}\, c(1/2)_x \\ \left(1 - \sqrt{1-(2t)^2}\right) c(0)_y + \sqrt{1-(2t)^2}\, c(1/2)_y \\ (1-2t) c(0)_z + 2t c(1/2)_z \end{pmatrix}$$

for $0 \le t \le ½$ and $$c(t) = \begin{pmatrix} \left(1 - \sqrt{1-(2-2t)^2}\right) c(1/2)_x + \sqrt{1-(2-2t)^2}\, c(1)_x \\ \left(1 - \sqrt{1-(2-2t)^2}\right) c(1/2)_y + \sqrt{1-(2-2t)^2}\, c(1)_y \\ (2-2t) c(1/2)_z + (2t-1) c(1)_z \end{pmatrix}$$

for $½ \le t \le 1$. The projection of the default path to the xy-plane is the line segment connecting c(0) and c(1). A parabolic path can easily be provided by substituting $(1-x^2)$ for the square root of $(1-x^2)$. The elements for Put_e1_divide and Put_e1_merge are as follows.

For Put_e1_divide:
  f: the shape function of the contour to which $e^1$ is attached
  c: the path of $e^1$
  c(0) and c(1) = specified by $s_1$ and $s_2 \in [0,1]$ where c(0)=$f(s_1)$ and c(1)=$f(s_2)$ respectively
  $g_1$ and $g_2$: obtained by dividing the contour along c For Put_e1_merge:

c: the path of $e^1$ $f_1$ and $f_2$: the shape functions of the contours to which $e^1$ is attached c(0) and c(1): specified by $s_1$ and $s_2 \in [0,1]$ where $c(0)=f_1(s_1)$ and $c(1)=f_2(s_2)$ respectively g: obtained by merging the contours along c The transformation for Put_e1_divide is performed by transforming the contour using the path of $e^1$ as the guiding curve; i.e., $F(s_1, t)=c(t/2)$ and
$F(s_2, t)=c(1-t2)$.

On the other hand, the transformation for Put_e1_merge is obtained as $F_1(s_1, t)=c(t/2)$ and
$F_1(s_2, t)=c(1-t/2)$.

With the premised techniques having been described above, a summary of how the premised techniques are related to the present invention will be described below.

Regarding surface encoding based on Morse theory, according to Morse theory, a topological space in the same homotopy type as an original object that is a manifold can be constructed by cells based on information regarding singular points and their indices. If mathematical precision is ignored, the three-dimensional shape of an original object can be conceptually reproduced by using extremely small amounts of information regarding the singular points, in this case the positions of the singular points and indices thereof, and a sequence of the singular points. However, Morse theory does not teach how cells are actually connected, that is, connected components of cells.

Reeb graphs help solve problems in Morse theory. Reeb graphs show the connecting components. The connections between singular points, that is, between nodes, can be understood from edges of a Reeb graph. By combining Morse theory with a Reeb graph, the three-dimensional shape of an object can be represented. More specifically, existing polygon data representing an object shape is obtained first, and by extracting information regarding singular points of a Morse function from the data, connection information regarding the singular points is then obtained. An object shape can be described in principle by this information alone. Employing this approach, object surface can be divided into pieces most effectively so that surface patches are uniquely pasted on the object.

It should be noted that it is mainly an object structure or a skeleton that can be reproduced by Morse theory and a Reeb graph. Therefore, more precise object shape description depends on additional information regarding its outer shape. In the present invention, contour information of an object is obtained for that purpose.

Regarding surface construction from codes using operators, section [2]above shows how to paste surfaces on an object after an object skeleton is described by the method described in section [1] above. In section [1], the concept of homotopy type is introduced, while homotopy of functions is described in section [2]. In the present invention, a surface originally represented by polygon data is represented by homotopies more smoothly and with a smaller amount of data.

According to sections [1] and [2], surfaces can be created on an object by continuously deforming the contour shape between critical cross sections by using a homotopy. Between critical cross sections, the topology of a contour never changes, which is suitable for representation by a homotopy. On the other hand, the topology of a contour changes if it crosses a critical cross section. Therefore, a surface is represented by a homotopy for each of portions of the surface defined by neighboring contours. Thus, critical cross sections define a necessary and sufficient partition of an object surface into a number of portions, each of which can be represented by a continuous function such as a homotopy.

A method called "skinning" has been known in surface modeling in CAD. In this method, when an object such as a wing of an airplane is designed, several shapes of ribs thereof are first specified. The object surface is generated by pasting surfaces between contours of the ribs. However, this method cannot deal with the case where an object branches off, since this method is not based on topological observations.

In the present invention, critical cross sections correspond to nodes of a Reeb graph, while edges of a Reeb graph correspond to object portions between critical cross sections. Pasting surfaces using homotopies between critical cross sections is equivalent to pasting surfaces which are homeomorphic to a cylinder around each edge of a Reeb graph. If an object is described by a Reeb graph, a surface homeomorphic to a cylinder can always be pasted between nodes. Since a surface homeomorphic to a cylinder can be divided certainly into a plurality of quadrilaterals, a surface between nodes can be divided into quadrilateral surface patches. This means that surface patches can always be pasted on any object effectively, based on the theories described in sections in [1] and [2] above, and solves the pending problem, that is, easy and secure representation of a complex object by free-form surfaces. As a result, it leads to automatic conversion of polygon data which is a "linear" expression into topological data which is "non-linear" representation.

Embodiments

Figure 17:
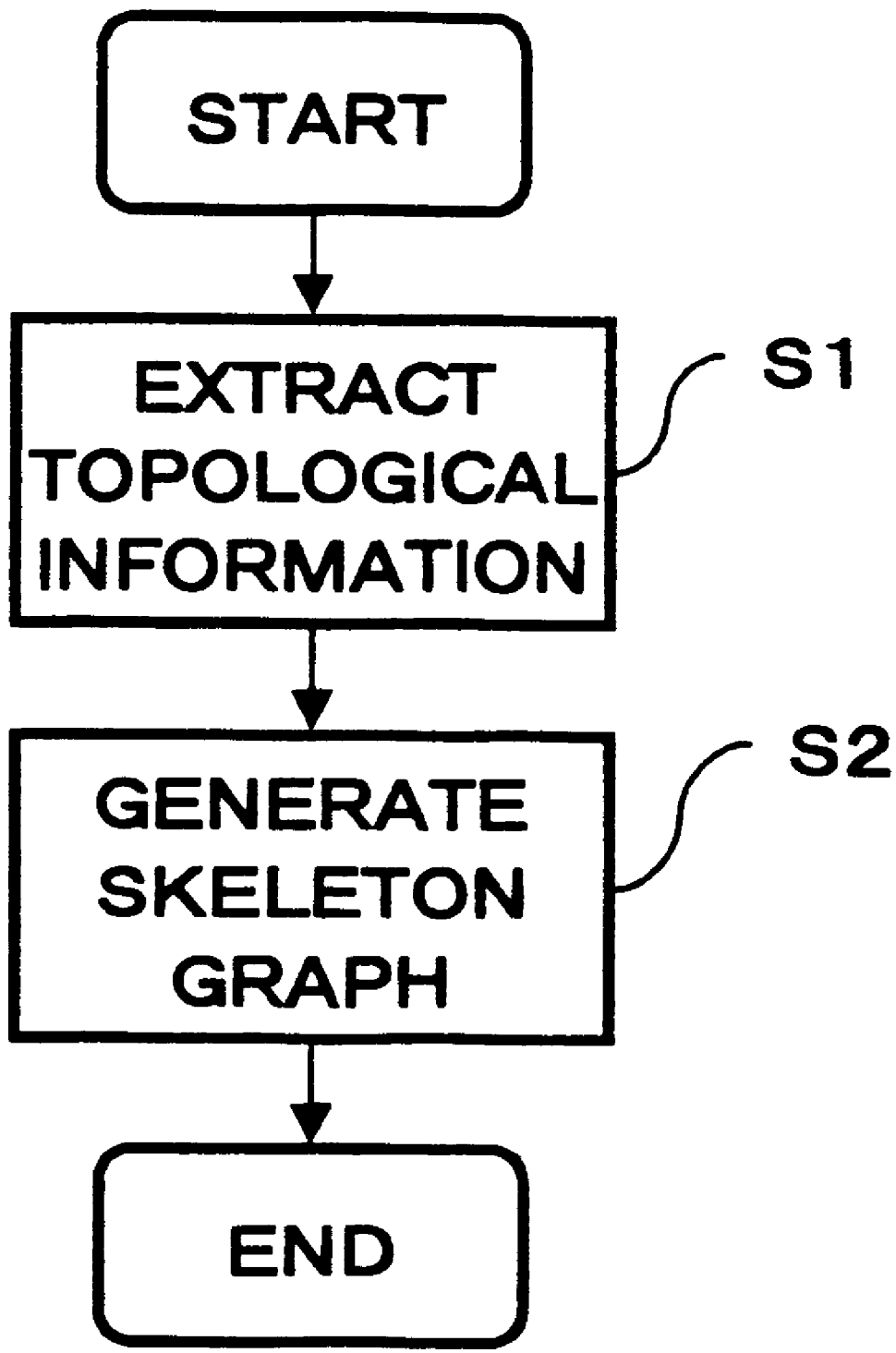
FIG. 17 is a flow-chart showing an object structure graph generating procedure.

FIG. 17 is a flowchart showing process of a structure graph generating method related to the present invention. In the premised techniques, a Reeb graph is generated by a designer. In this embodiment, a Reeb graph is automatically generated from existing polygon data. Topological information of an object is extracted (S1) after polygon data representing the shape of an object is obtained. The topological information characterizes the global structure of the object and is not local topological information such as which polygon lies next to which. (In both cases, the word "topology" is used. However, the former is a term mainly used in mathematics, while the latter is mainly used in CAD.)

Based on the global topological information, a skeleton graph of the object is generated (S2). In the premised techniques, a Reeb graph is used. However, a Reeb graph may not be necessarily used here. For example, a torus may be simply represented by a circle. A graph which simplifies, codes, or symbolizes an object structure can be used. A graph is usually composed of nodes and edges. When a torus is represented by a circle, this circle may seem to have no nodes. In such a case, an imaginary node may be added and the circle can be regarded as a graph. Furthermore, although a skeleton graph is generated, visualization of the graph is not necessarily needed. Therefore, it is adequate to collect information sufficient to generate a skeleton graph only. These two rules or simplifications are meant to be effective for the embodiment described in this specification.

A skeleton graph of the object is generated from polygon data through the processing described above. By the processing shown in FIG. 17, the global structure information of the object is attained as a part of its shape data.

Figure 18:
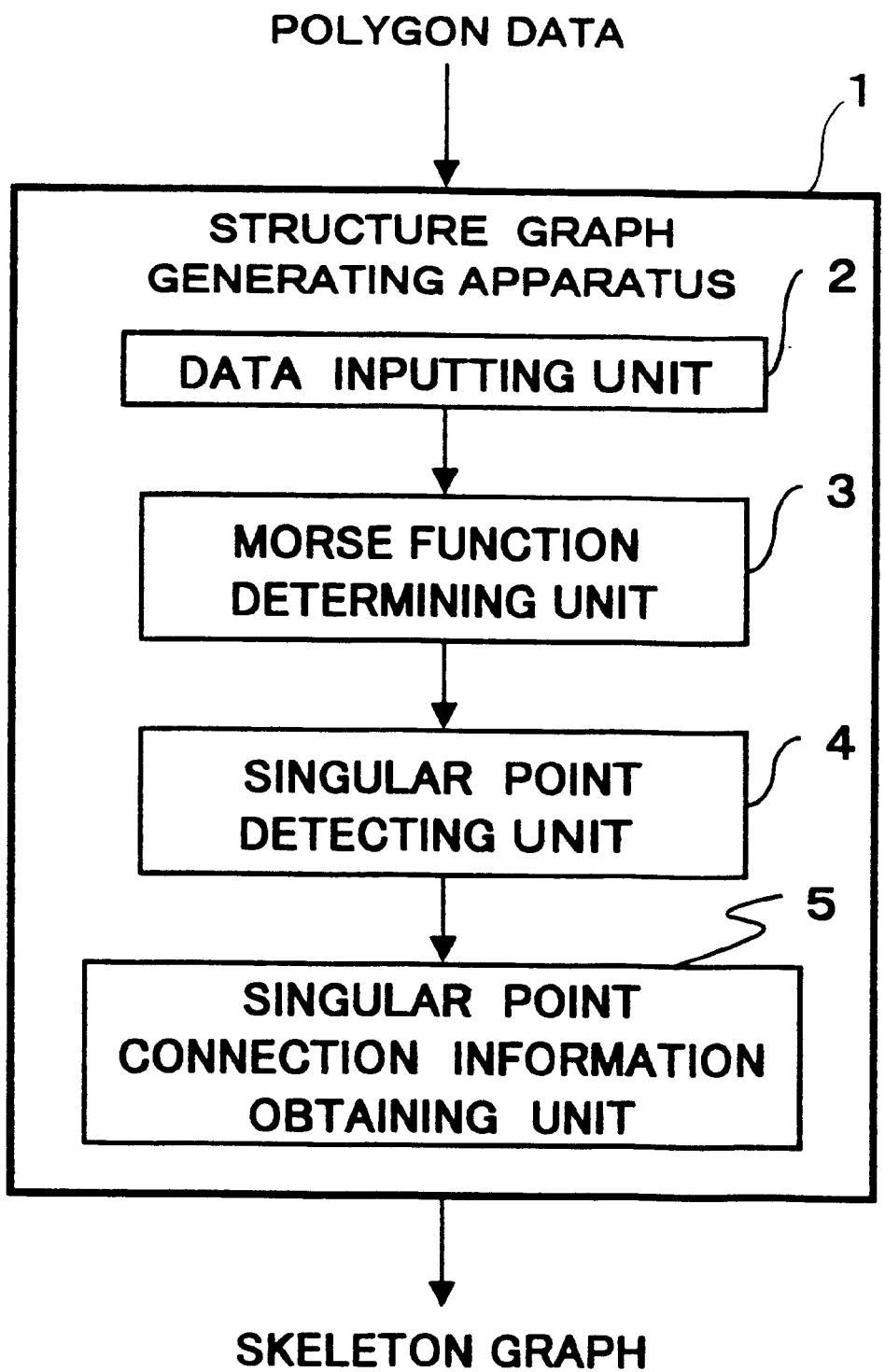
FIG. 18 shows a configuration of an object structure graph generating apparatus.

FIG. 18 shows a configuration of a structure graph generating apparatus which implements the process shown in FIG. 17. The apparatus 1 includes a data inputting unit 2 for obtaining polygon data. The data inputting unit 2 may be a communication unit which receives polygon data from a network, or a storage control unit which reads polygon data from a storage. It may also be an apparatus which obtains coordinates of an object, such as a three-dimensional digitizer which photographs an object and converts its surface into polygons. The apparatus 1 further comprises a Morse function determining unit 3 which determines a Morse function defined on the obtained polygon data, a singular point detecting unit 4 which detects singular points of the Morse function, and a singular point connection information obtaining unit 5 which obtains connection information between the singular points.

Figure 19:
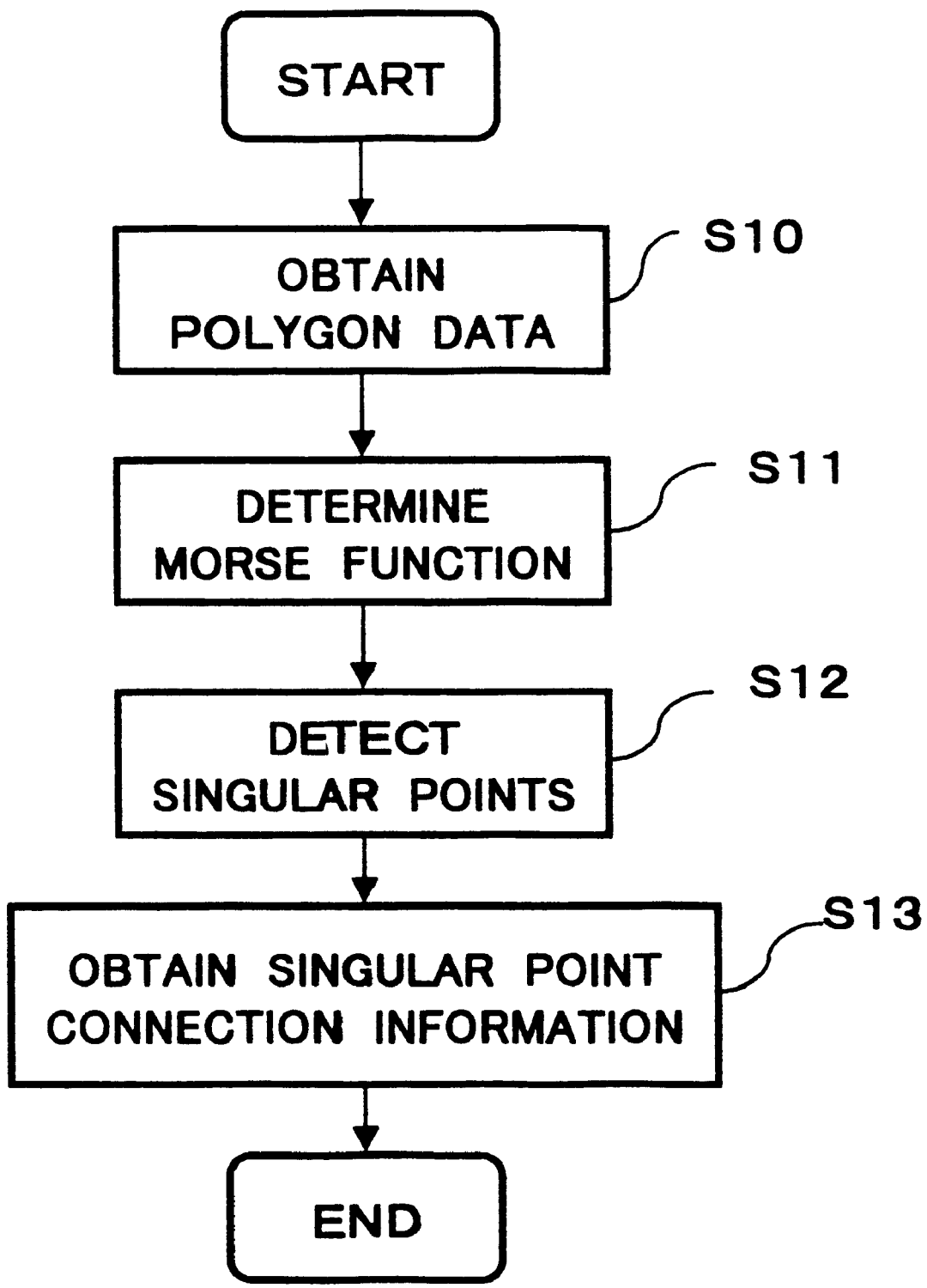
FIG. 19 is a flow-chart showing processing by the structure graph generating apparatus shown in FIG. 18.

FIG. 19 is a flowchart showing operations of the apparatus 1. The data inputting unit 2 inputs polygon data of an object (S10). The polygon data is transferred to the Morse function determining unit 3. A height function is used as a Morse function and determining a Morse function is accomplished by determining a direction of a height. Examples of how to determine the height direction are as follows:

(i) The z direction (the height direction) of the polygon data itself may be used as the height direction of the Morse function.

(ii) Alternatively, the height direction may be decided depending on the shape of the object. For example, the height direction may be decided so that the length of the object measured along the height direction is the longest dimension of the object.

(iii) Alternatively, the height direction may be decided depending on topological characteristics of the object. For example, the height direction may be decided so that a relatively large number of singular points is found along the direction.

(iv) Alternatively, the height direction may be decided by a user's instruction.

The Morse function determining unit 3 determines a Morse function based on one of the above methods or other methods (S11). A curvature of an object surface may be adopted as an example of a Morse function other than a height function. This method has the advantage that a curvature of an object surface does not depend on the direction of the z axis.

The processing proceeds to the singular point detecting unit 4. In the case of an object having a smooth surface, singular points of the object and their indices are found by scanning the object along the height direction, as has been explained in the premised techniques. However, since polygon data including vertices which are not differentiable are used here, a new definition of a singular point is needed. A singular point is defined as follows, based on its index. When edges converging to a vertex V of a polygon are denoted as Ei (i=1, 2, . . . n) in clockwise (or counter-clockwise) direction, an edge Ei is described as "+" if the edge Ei is an ascending curve starting from V, while "−" if it is a descending curve starting from V.

1. Index 0 (Pits)

Figure 20:
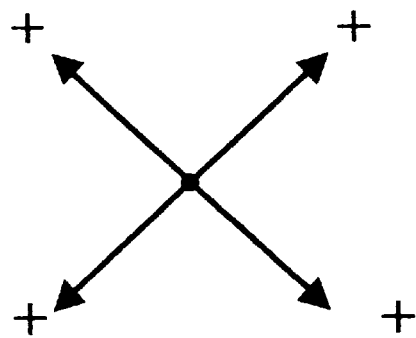
FIG. 20 is a diagram showing edges of polygons near a pit.

As shown in FIG. 20, when all Ei's are "+", V is a singular point with an index of zero.

2. Index 1 (Saddles)

Figure 21:
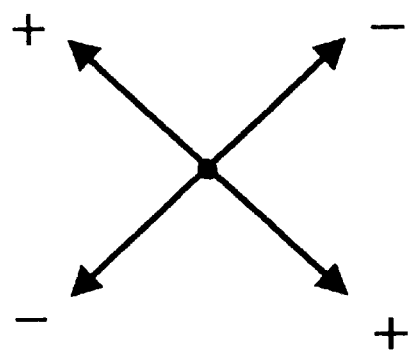
FIG. 21 is a diagram showing edges of polygons near a saddle.

As shown in FIG. 21, when n=4, if E1 to E4 are in the order of "+−+−" or "−+−+", V is a singular point with an index of one. Generally speaking, V is a singular point with index 1 if the ordered series of edges Ei can be divided into 4 groups E1 to Es, Es+1to Et, Et+1 to Eu, and Eu+1 to En where S≧1, t≧S+1, u≧t+1, and n≧u+1, the edges in each group having the same sign ("+" or "−"), and if the signs of the four groups are "+−+−" or "−+−+".

3. Index 2 (Peaks)

Figure 22:
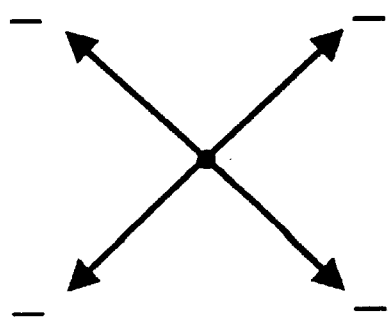
FIG. 22 is a diagram showing edges of polygons near a peak.

As shown in FIG. 22, when all Ei's are "−", V is a singular point with an index of 2.

Based on the above definitions, the singular point detecting unit 4 detects coordinates and indices of the singular points by using coordinates of polygon data (S12). The coordinates of the singular points form a part of geometric information regarding singular points.

Figure 23:
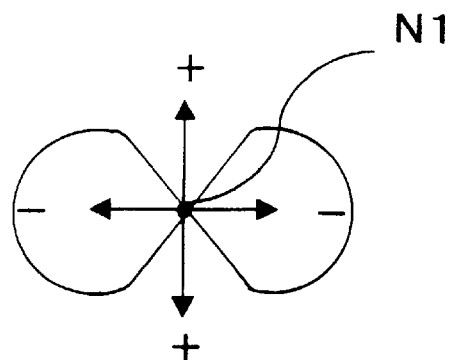
FIG. 23 is a diagram showing a shape of contours near a singular point with index 1.
Figure 24:
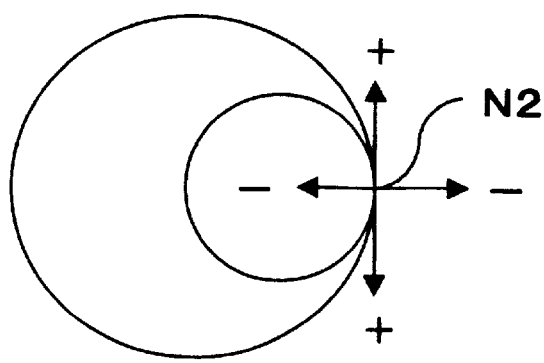
FIG. 24 is a diagram showing another shape of contours near a singular point with index 1.
Figure 25:
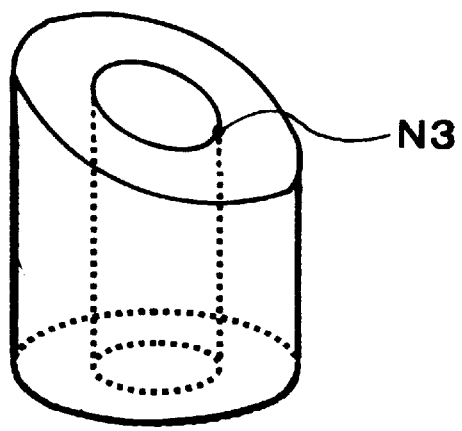
FIG. 25 is a diagram showing an object which generates the contours in FIG. 24.

The shape of a cross section in the vicinity of a singular point whose index is either 0 or 2 is always a loop (a figure which is homeomorphic to a circle). However, for a singular point with index 1, there are two cases. One is the case where a singular point takes place at a point N1 at which two contours are circumscribed as shown in FIG. 23. The other is the case where a singular point exists at a point N2 at which two contours, one of which exists inside the other, are in contact with each other, as shown in FIG. 24. An example of the point N1 in FIG. 23 is the upper saddle of the torus shown in FIG. 3(a), when "+" and "−" of inclination is taken into consideration. An example of the point N2 in FIG. 24 is the point N3 shown in FIG. 25 which is on the edge of the inside wall of a hollow cylinder cut diagonally. In this embodiment, a Reeb graph represented by icons which can describe the internal structure of an object may be generated as described in the premised techniques. In the above examples, the two contours in the case of FIG. 23 are "siblings", but "parent-child" in the case of FIG. 24. The processing for these two types of singular points is different and the shape of the cross section is checked in advance. When a singular point having an index of 1 is found, the shape of a cross sectional contour including the point is examined to determine whether it is of the type of pattern in FIG. 23 or 24.

Figure 26:
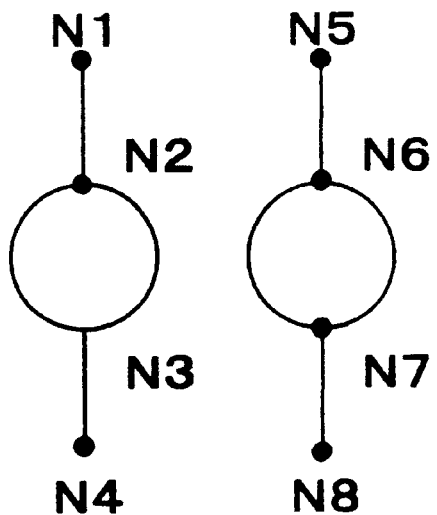
FIG. 26 is a diagram showing a Reeb graph for "two independent toruses"
Figure 27:
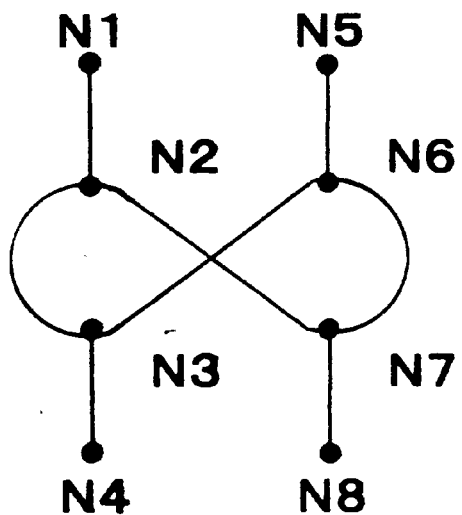
FIG. 27 is a diagram showing a Reeb graph of a "twisted torus".

The singular point connection information obtaining unit 5 then grasps or detects connection between singular points (S13), which is topological information regarding the singular points. FIGS. 26 and 27 show Reeb graphs corresponding to objects composed of "two independent toruses" (FIG. 2(a)) and "a twisted torus" (FIG. 2(b)) respectively. Although the singular points and their indices are exactly the same, the Reeb graphs are different for the two objects. The singular point connection information obtaining unit 5 obtains connection information by tracking edges of polygons. In the case of "two toruses" (FIG. 2a), there exist polygon edges connecting singular points N1 and N2, and N2 and N3. However, there is no edge connecting N2 and N7. In the case of the "twisted torus", there exists an edge connecting N2 and N7. By repeatedly applying this procedure, connections between singular points are all found, and a Reeb graph will be completed. In the cases shown in FIGS. 26 and 27, Reeb graphs are described by singular points, their indices and connection information between the singular points. When generating a Reeb graph considering the internal structure as well, the Reeb graph may be described by the operators or icons shown in FIGS. 5–13.

Figure 28:
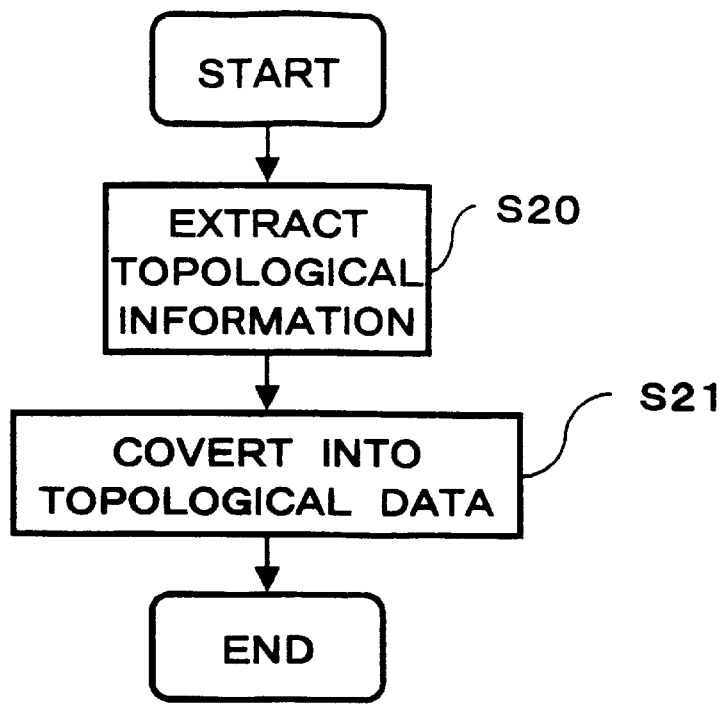
FIG. 28 is a flow-chart showing processing in a data converting method.

FIG. 28 is a flowchart showing the principle of data converting method of the present invention. After polygon data is obtained, topological information of an object is extracted (S20). This processing is the same as S1 in FIG. 17. The information is then converted into topological data (S21). The processing in S20 and S21 may be recorded in a recording medium readable by a computer.

Figure 29:
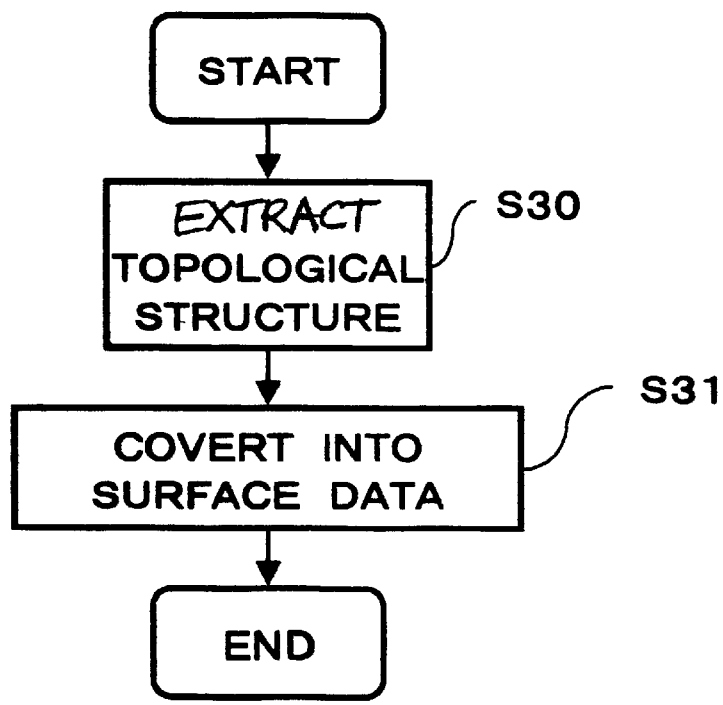
FIG. 29 is a flow-chart showing processing in the data converting method described in another form of expression.

FIG. 29 is a flow-chart showing the data converting principle in another expression. After polygon data is obtained, the topological structure of an object is extracted (S30), and based on the resultant information thus obtained, the polygon data is converted into surface data (S31). In this case, the processing in S30 and S31 can also be recorded in a recording medium.

Figure 30:
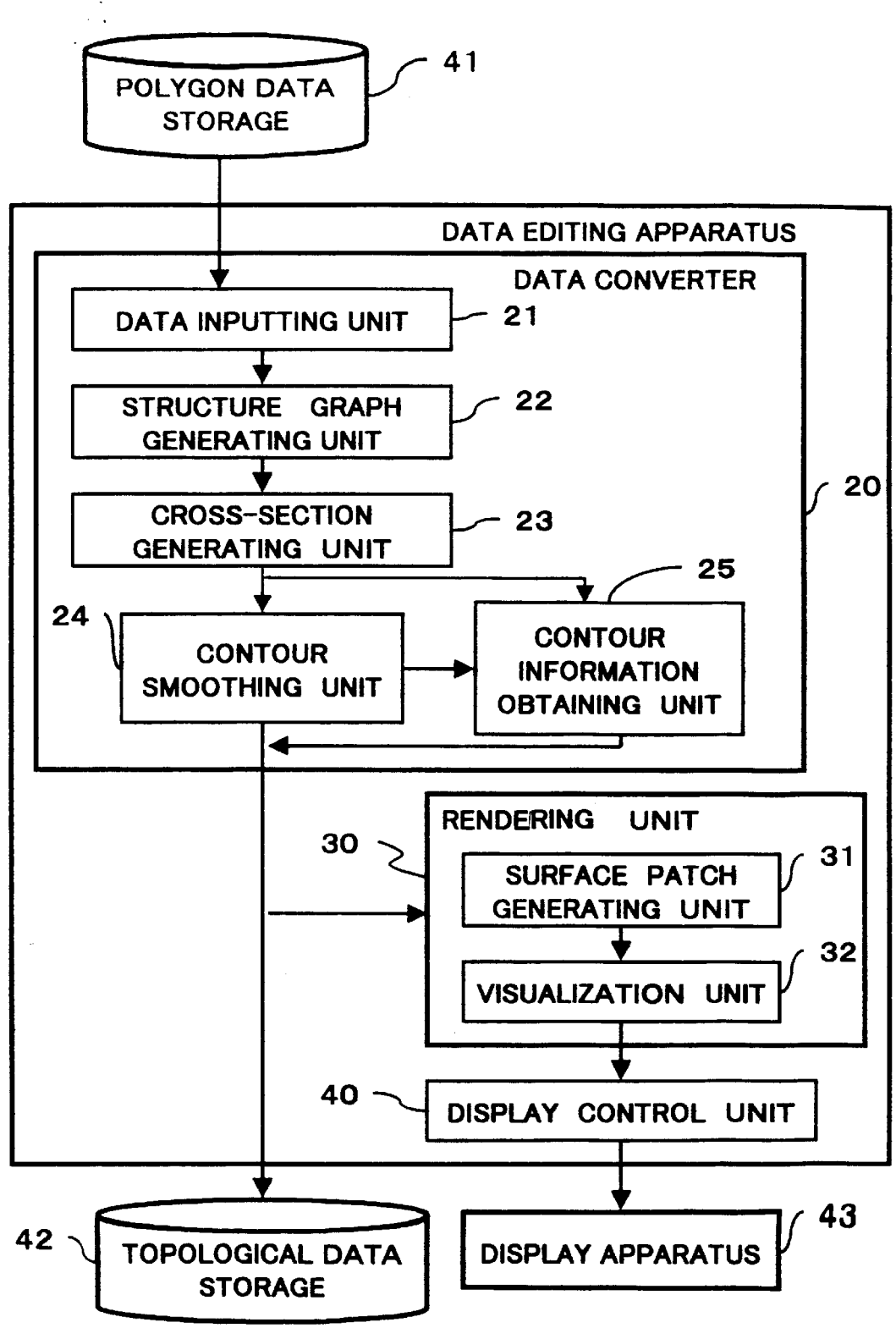
FIG. 30 shows a configuration of a data editor employing a data transforming apparatus of the present invention.

FIG. 30 shows a configuration of a data editing apparatus 10 comprising a data converter 20 which carries out the processing based on the flow-charts in FIGS. 28 and 29 described above. The apparatus 10 further comprises a rendering unit 30 which renders visual data for visual confirmation, and a display control unit 40 which controls output of the visual data to a display apparatus 43. The configuration of FIG. 30 may be realized by software modules or by hardware circuits.

The data converter 20 comprises a data inputting unit 21 for inputting necessary polygon data of an object from a polygon data storage 41, a structure graph generating unit 22 for generating a skeleton graph of the object based on the polygon data, a cross section generating unit 23 for slicing the object at appropriate positions, a contour smoothing unit 24 for smoothing the cross sectional contours, and a contour information obtaining unit 25 for obtaining information regarding the cross sectional contours and adds the information to the skeleton graph. As the skeleton graph generating unit 22, the apparatus shown in FIG. 18 may be used.

Figure 31:
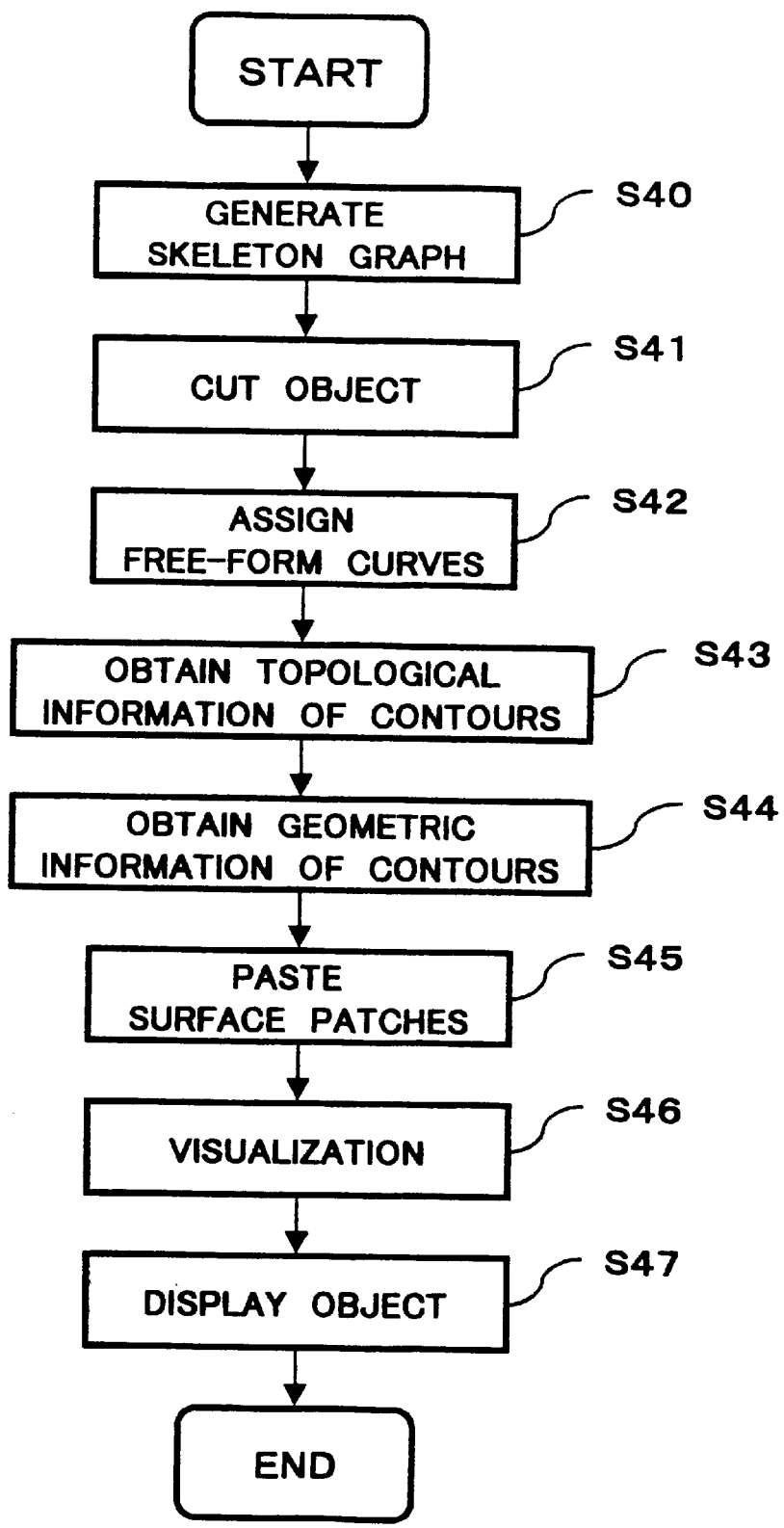
FIG. 31 is a flow-chart showing processing by the data transforming apparatus shown in FIG. 30.

FIG. 31 is a flowchart showing a procedure of data conversion by the apparatus 10. The data inputting unit 21 inputs polygon data of an object and the structure graph generating unit 22 generates a skeleton graph in the manner described earlier (S40). The cross section generating unit 23 then slices the object (S41) at the height including a singular point and orthogonal to the z axis, as has been described in the premised techniques.

Figure 32:
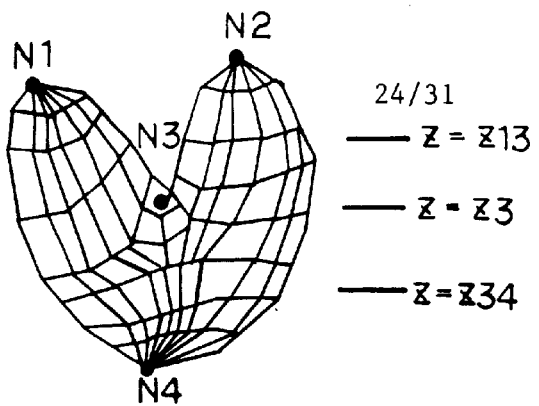
FIG. 32 is a diagram showing visualized polygon data of a heart-like object.

FIG. 32 shows visualized polygon data of a heart-like object. In FIG. 32, points N1 and N2 are peaks, N3 a saddle, and N4 a pit. Among these points, the points except for N3 have cross sections which are dots. It is therefore theoretically necessary and sufficient to know the shape of the cross section at N3. However, to enhance precision of shape represented by topological data, cross sections at height other than the singular points, such as z=z13 located between N1 and N3, and z=z34 between N3 and N4, are used. Appropriate height for cutting the object may be determined automatically. For example, when a distance between singular points is somewhat long, a new cross section may be taken at a midpoint.

Figure 33:
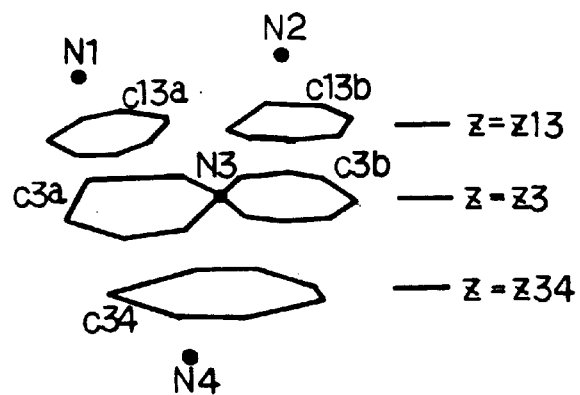
FIG. 33 is a diagram showing some contours of the object in FIG. 32.

FIG. 33 shows contours of three cross sections obtained in the above manner. Here, the right and left contours at z=z3 which is the height of N3 are shown as C3a and C3b, respectively. The right and left contours at z=z13 are denoted as C13a and C13b, respectively, while the right and left contours at z=z34 are C34a and C34b, respectively.

As shown in FIG. 33, these contours themselves are polygons. The contour smoothing unit 24 assigns free-form curves to these contours (S42). In one method for smoothing, vertices of polygonal contours are used as control points, and spline curves such as NURBS, or Bézier curves are fit to these contours.

Figure 34:
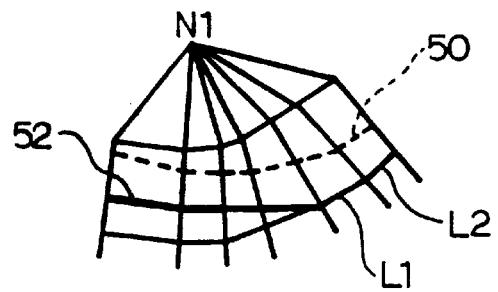
FIG. 34 is a diagram showing how a cross sectional surface is determined.

In this embodiment, the cross-section is orthogonal to the z-axis. However, in another embodiment, a cross-section is determined so that it includes an edge of a polygon. FIG. 34 shows enlarged polygons near the contour C13a on the left of z=z13 in FIG. 33. If a cross section which is orthogonal to the z axis intersects the inside of polygons as shown by a broken line 50 in FIG. 34, the position of the cross section is shifted to a position shown by a solid line 52 in FIG. 34 so that the cross section includes polygon edges L1 and L2.

In this manner, a vertex of a contour coincides with a vertex of a polygon, which reduces calculation cost. A cross section is not necessarily on a single plane, but may be set in a manner wherein it contains as many edges of the original polygons as possible.

The contour information obtaining unit 25 then obtains topological and geometric information regarding the contours respectively (S43, S44). Topological information of contours includes contour inclusion relation (e.g., sibling, parent-child) and contour correspondence. The contour inclusion relation information has already been obtained by the singular point detecting unit 4 (FIG. 18) in the structure graph generating unit 22, and is used here. For the contour correspondence information, it is necessary to know, for example, which of the contours C3a and C3b at z=z3 corresponds to the contour C13a at z=z13 in FIG. 33. The singular point connection information obtaining unit 5 judges connections between the singular points, not between the contours. Therefore, to determine contour correspondence, a path reaching from one contour to another via edges of polygons is found without paying attention to singular points. In the case shown in FIGS. 32 and 33, edges starting from the contour C13a on the left at z=z13 reach the contour C3a which is also on the left at z=z3. In this manner, correspondence (C13a, C3a, C34) and (C13b, C3b, C34) is obtained.

Figure 35:
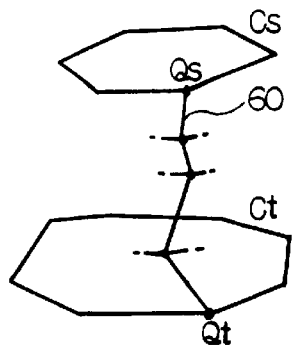
FIG. 35 is a diagram showing how to detect corresponding points on contours.

Geometric information of a contour includes contour shape information and information regarding positions of corresponding points between contours. For the former, free-form curve equations which approximate the contours and which the contour smoothing unit 24 has obtained are used. The latter can be obtained in the following alternative ways:

(i) Obtained by using polygon edges. For example, as shown in FIG. 35, among paths staring from a point Qs on a contour Cs and tracking edges of polygons, if a path 60 which has the shortest distance to a contour Ct is selected, the path 60 reaches Qt. Therefore, Qs and Qt are deemed to be corresponding, and their coordinates are obtained.

(ii) Obtained by calculating distances between contours. A plurality of points are taken on contours Cs and Ct, and coordinates of necessary points are obtained by assuming that a pair of points (one from Cs, one from Ct) which are closest to each other are regarded as corresponding points.

Figure 36:
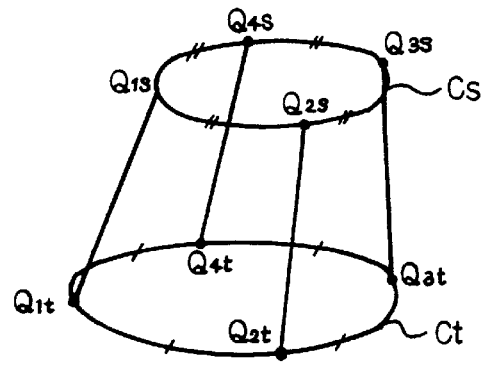
FIG. 36 is another diagram showing how to detect corresponding points on contours.

(iii) Obtained by using positions on contours. As shown in FIG. 36, points Q1s and Q1t having the smallest x coordinates are detected on contours Cs and Ct respectively. Q2s and Qt2 are obtained by advancing along the contours Cs and Ct by ¼ of their circumstances from Q1s and Q1t. Likewise, Q3s and Q3t, Q4s and Q4t are determined. Under an assumption that Q1s and Q1t, Q2s and Q2t, Q3s and Q3t, and Q4s and Q4t are corresponding, their coordinates are obtained. This completes the processing at the contour information obtaining unit 25.

Figure 37:
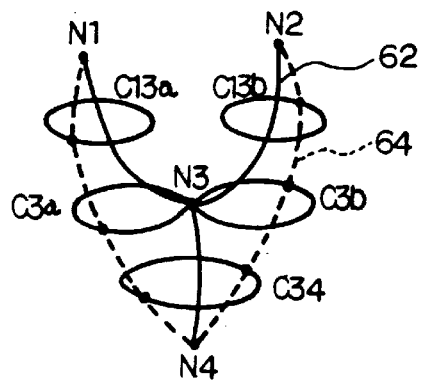
FIG. 37 is a diagram showing visualized topological data resulted from a data conversion.

FIG. 37 shows singular points N1–N4, a Reeb graph 62, contours C13a, C13b, C3a, C3b, and C34, and connection information between corresponding points which is partially shown by a broken lines 64, all of which have been obtained through the above process. The corresponding points are connected by free-form curves whose control points are the corresponding points on the contours and which are called guiding curves in the premised techniques. The guiding curves provide information regarding the shape of paths connecting the corresponding points on contours.

FIG. 38 shows data elements composing the information obtained through the process described above (hereinafter called "core information"). As shown in FIG. 38, nodes N1 and so on included in the Reeb graph are described by their three-dimensional coordinates such as (x1, y1, z1) and indices such as index1. Edges such as E1 are described by combinations of nodes between which the edges are pasted, such as (N1, N2). Contours C1 and so on are described by nodes such as N1 to which they are related or the z coordinate of the nodes, free-form curve equations such as Ceq1, and other contours such as C2 which correspond thereto. Guiding curves G1 and so on are described by coordinates of the nodes such as N1 and the points on this contours such as Q1s and Q1t, all of which the guiding curves pass. Free-from curves have been adopted here as guiding curves. However, they may simply be line segments that connect edges of polygons.

As shown in FIG. 37, a portion of an object between contours thereof (excluding critical cross sections) is homeomorphic to a cylinder, and surface patches can always be pasted thereon. Therefore, the core information here is an example of topological data that has been converted from polygon data. Among the core information, guiding curves can be generated automatically by using the corresponding points, which in turn can be generated automatically from the contour information. Guiding curves and corresponding points are therefore not indispensable. If precision of the shape to be reproduced need not be considered, at least contours that include no critical points are unnecessary. The data editing apparatus 10 can generate core information uniquely from original polygon data, which is suitable for automatic processing.

After the core information has been generated, the data converter 20 outputs the information to a topological data storage 42 (FIG. 30). The conversion processing is complete at this stage. However, to confirm the conversion result, the rendering unit 30 is included in the data editing apparatus 10.

Figure 39:
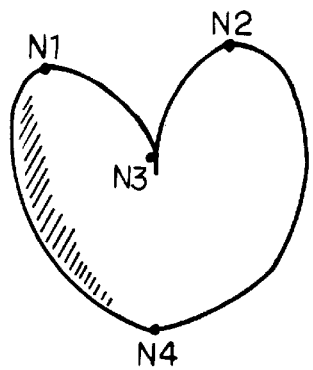
FIG. 39 is a diagram showing visualized topological data of the heart-like object.

The rendering unit 30 includes a surface patch generating unit 31 for pasting surface patches based on the core information. The surface patch generating unit 31 pastes patches on each of quadrilateral areas surrounded by the contours and the guiding curves (S45 in FIG. 31). A visualization unit 32 generates visual data for each patch that has been pasted by employing an existing method such as constant shading or direct ray tracing on free-form surfaces (S46). The visual data is displayed on the display apparatus 43 via the display control unit 40 (S47). If the original polygon data shows a heart-like shape in FIG. 32, the object displayed at this stage is smoother than the original, as shown in FIG. 39.

According to the data editing apparatus 10, the amount of core information stored in the topological data storage 42 is very small. Nevertheless, an object can be reproduced generally more smoothly than by the original polygon data. In an experiment where a human palm is modeled, the data for approximately 6000 vertices of polygons described in VRML has approximately 640 Kbytes of data (approximately 200 Kbytes when compressed by gzip), while the topological data described by the data editing apparatus 10 has about 3 Kbytes (when compressed by gzip, 1.5 Kbytes). For another object (not shown) described with a number of polygons having vertices faintly recognizable by human eyes, the shape thereof can be represented by topological data which is approximately 1/100 the size of polygon data. This shows that the present invention is not a mere data compression technique but a fundamentally different shape representation.

The topological data obtained by the data editing apparatus 10 is small in size and thus advantageous for transmission, storage, and editing. The present invention can make use of the enormous amount of polygon data that has been stored up to the present. By editing the topological data that has been generated, another object can be easily designed. The editing can be done with an easy operation, as simple as conventional drawing software packages.

Figure 40:
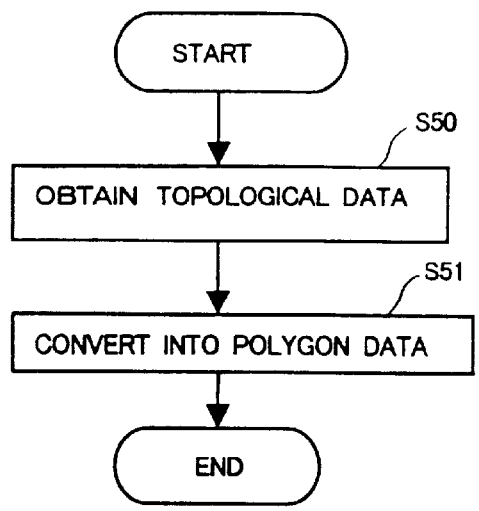
FIG. 40 is a flow-chart showing procedures of data inverting transformation.

When visualization of an object is concerned, some renderers available on the market do not work unless modeling has been carried out by the polygon method. FIG. 40 is a flow-chart showing a processing principle for coping with such a case. As shown in FIG. 40, topological data is obtained first (S50), and the data is reversely converted or inverted into polygon data noting the data structure (S51).

Figure 41:
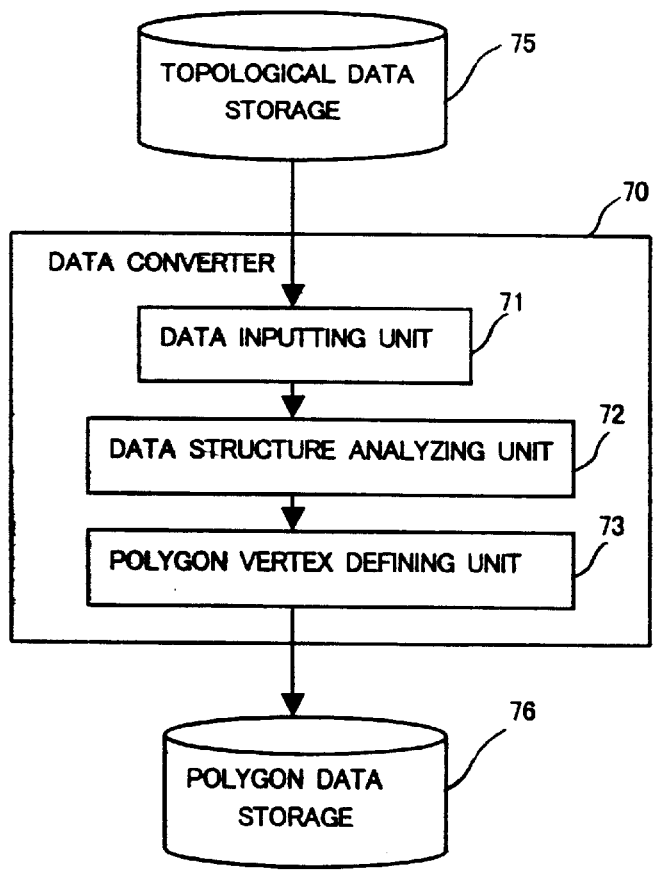
FIG. 41 shows a configuration of a data inverting transformer.

FIG. 41 shows a configuration of a data inverting transformer 70 which carries out the processing shown in FIG. 40. The data inverting transformer 70 comprises a data inputting unit 71 for inputting data from a topological data storage 75, a data structure analyzing unit 72 for analyzing the structure of the input data and extracts elements for composing an object surface, and a polygon vertex defining unit 73 for determining polygon vertices by setting discrete points on the surface composed of the extracted elements. The vertices of the polygons are output to a polygon data storage 76.

In this configuration, the topological data or the core information is input from the topological data storage 75 to the data inputting unit 71. The input data is transferred to the data structure analyzing unit 72. The data has a structure shown in FIG. 38, for example. From the input data, the data structure analyzing unit 72 reads out information regarding contours and guiding curves.

Figure 42:
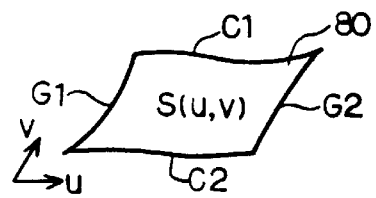
FIG. 42 is a diagram showing a quadrilateral area formed by guiding curves and contours.

FIG. 42 shows a quadrilateral area 80 which is defined by two contours C1 and C2, and two guiding curves G1 and G2. The polygon vertex defining unit 73 pastes parametric patches S(u, v) (0<u, v<1), such as tensor product surfaces, Coons surfaces, or Gregory surfaces, on the area 80. An area that includes a node will be triangular, which may be deemed to be a degenerate quadrilateral and treatable by a conventional technique. The positions of S(u, v) are plotted while the parameters u and v are being gradually changed. To improve precision of the polygon data, steps of u and v are set small.

Figure 43:
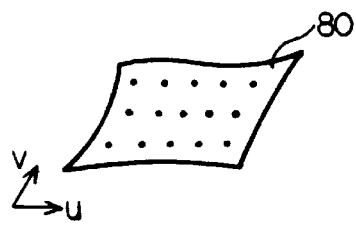
FIG. 43 is a diagram showing grid points within the quadrilateral area of FIG. 42.
Figure 44:
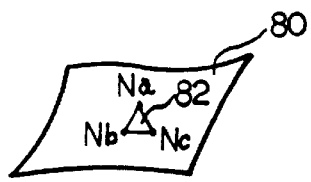
FIG. 44 is a diagram showing a polygon within the quadrilateral area of FIG. 42.

FIG. 43 shows points plotted in this manner, and these points are determined to be vertices of polygons. As shown in FIG. 44, a triangular area 82 is described by three vertices (Na, Nb, and Nc) composing the area, for example. In this manner, inversion to polygon data is completed and the obtained data is stored in the polygon data storage 76.

Figure 45:
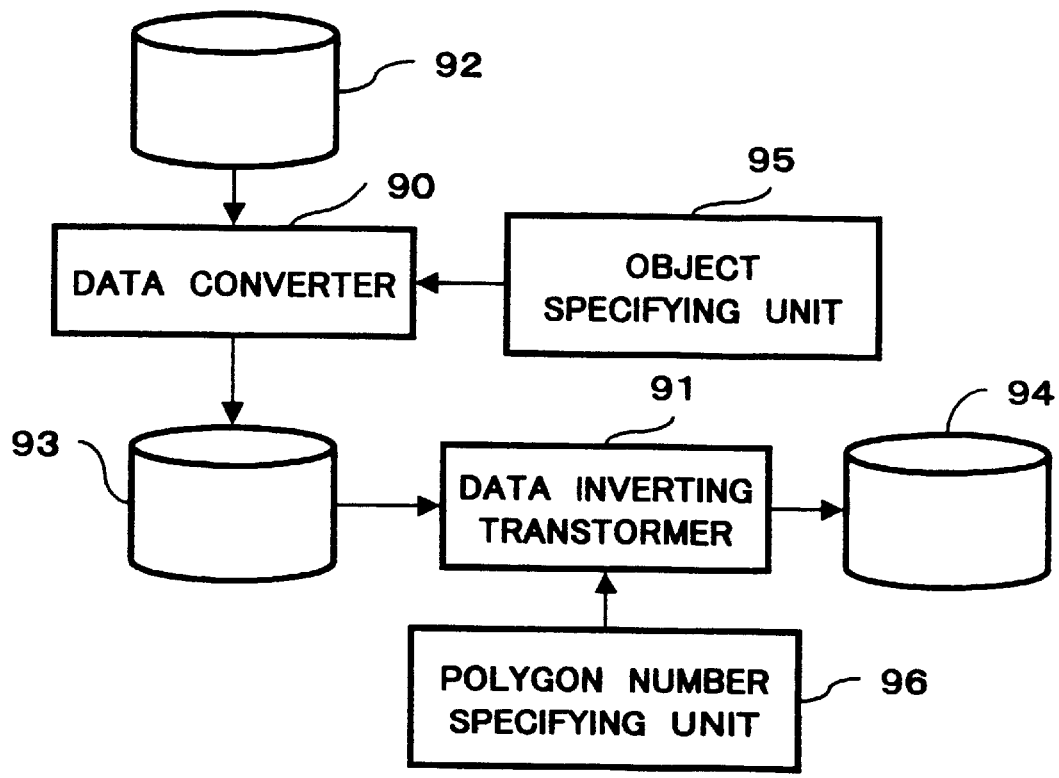
FIG. 45 shows a configuration of a system which carries out data conversion and inversion.

FIG. 45 shows a system configuration including both a data converter 90 and a data inverter 91. As shown in FIG. 45, the data converter 90 first reads out polygon data of an object which a user desires to use from a first storage 92, based on an instruction from an object designating or specifying unit 95. The data converter 90 then converts the data into topological data using the procedure described above and stores the converted data in a second storage 93. The data inverting transformer 91 reads the topological data or core information of the object from the second storage 93 and transforms the data or information into polygon data and stores the restored polygon data in a third storage 94. Steps of the parameters u and v (see FIG. 43) are decided so that the number of polygons to be generated would be close to the number of polygons designated by a polygon number specifying unit 96. Preferably, the polygon number specifying unit enables not only the direct specification of polygon numbers but also specification of whether the number of polygons should be increased or decreased. Designation of the total amount of the restored polygon data is also possible. According to this system, conversion between polygon data sets, such as conversion from rough polygon data into finer polygon data, can also be realized.

Figure 46:
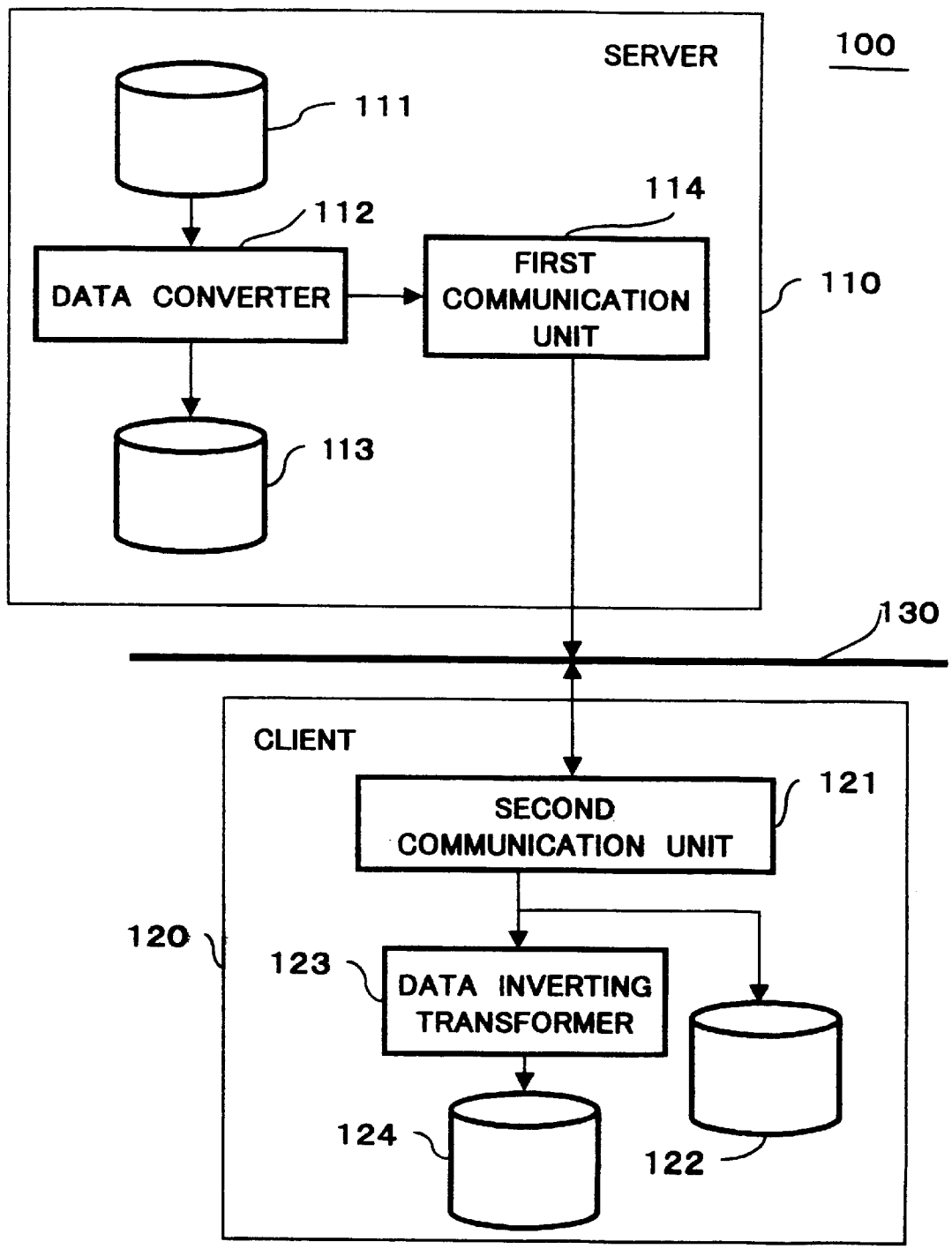
FIG. 46 shows a configuration of a server-client system which is an application example of the system in FIG. 45.

FIG. 46 shows a configuration of a server-client system 100 according to an embodiment of the present invention. A server 110 comprises a first server storage 111 for storing existent polygon data, a data converter 112, a second server storage 113 for storing topological data obtained through conversion, and a first communication unit 114 for communicating with a client 120 via a network 130.

The client 120 comprises a second communication unit 121 for communicating with the server 110, a first client storage 122 for storing topological data received from the server 110, a data inverting transformer 123, and a second client storage 124 for storing the inverted data.

Figure 47:
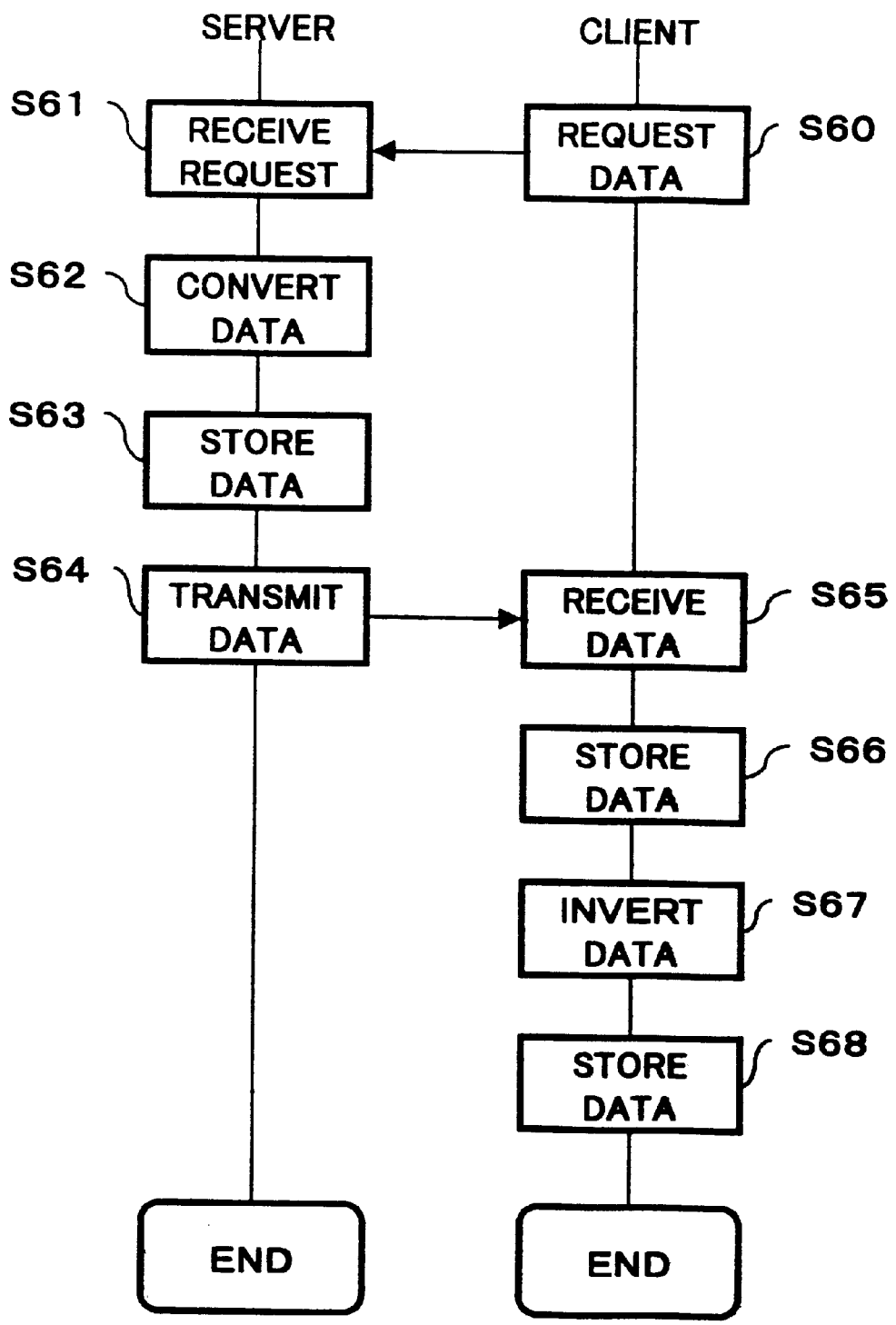
FIG. 47 is a flowchart showing an operation of the system in FIG. 46.

FIG. 47 shows communications between the server 110 and the client 120 of the system 100 in FIG. 46. When the client 120 needs an object data, the client requests the data via the second communication unit 121 (S60). The server 110 receives the request via the network 130 and the first communication unit 114 (S61). After reading the appropriate polygon data from the first server storage 111, the server 110 converts the data into topological data with the data converter 112 (S62). The topological data is then stored in the second server storage 113 (S63), and transmitted to the client 120 (S64).

The client 120 receives the data (S65), and stores the data in the first client storage 122 (S66). The client 120 may use the data directly if the client 120 can handle the topological data. If polygon data is necessary, the client 120 inverts the topological data into polygon data with the data inverter 123 (S67), and stores the inverted data in the second client storage 124 and uses the data (S68).

If the data requested by the client already exists in the second server storage 113 as topological data, the server 110 does not carry out conversion, but transmits the data to the client 120 after simply reading the data from the second server storage 113.

While embodiments and applications of the present invention have been shown and described, it should be apparent to those skilled in the art that many more modifications are possible without departing from the inventive concepts herein. The presently disclosed embodiments are therefore to be considered in all respects as illustrative and not restrictive, the scope of the invention being indicated by the appended claims, rather than the foregoing description. The accompanying claims are intended to cover such and other modifications as would fall within the true scope and spirit of the present invention. All changes which come within the meaning and range of equivalency of the claims are therefore intended to be embraced therein.

What is claimed is:

1. An object structure graph generating method wherein a skeleton graph of an object is generated by extracting topological information of the object from polygon data representing the shape of the object, wherein the topological information includes information regarding a singular point which is determined when a Morse function is defined on the object.

2. The method of claim 1 wherein the skeleton graph is a graph including the singular point as a node.

3. The method of claim 2 wherein the graph including the singular point as a node is a Reeb graph.

4. An object data converting method wherein topological information of an object is extracted from polygon data representing the shape of the object and the polygon data is converted into data based on topological modeling using the topological information, wherein the topological modeling uses Morse theory regarding a singular point.

5. The method of claim 4 wherein the topological modeling uses homotopy theory.

6. The method of claim 4 wherein the topological modeling uses a skeleton graph showing a structure of the object.

7. The method of claim 6 wherein the skeleton graph is a Reeb graph.

8. The method of claim 4 wherein the topological information includes information regarding a singular point which is determined when a Morse function is defined on the object.

9. The method of claim 8 wherein the information regarding a singular point includes an index of the singular point.

10. The method of claim 8 wherein the information regarding a singular point includes connection information between the singular points.

11. The method of claim 4 wherein the topological information includes information regarding a cross-sectional contour of the object.

12. The method of claim 11 wherein the information regarding the contour includes information regarding an inclusion relation among the contours.

13. The method of claim 11 wherein the information regarding the contour includes information regarding correspondence between the contours.

14. The method of claim 13 wherein the information regarding correspondence is obtained by tracking edges of polygons.

15. The method of claim 4 wherein the topological modeling further uses geometric information of the object.

16. The method of claim 15 wherein the geometric information includes information regarding a singular point which is determined when a Morse function is defined on the object.

17. The method of claim 16 wherein the information regarding a singular point includes coordinates of the singular point.

18. The method of claim 15 wherein the geometric information includes information regarding a cross sectional contour of the object.

19. The method of claim 18 wherein the cross section is determined so that height direction of the object orthogonally crosses the cross section.

20. The method of claim 18 wherein the cross section is determined so that at least a portion of the cross sectional contour is composed of an edge of a polygon.

21. The method of claim 18 wherein the information regarding the contour includes an equation of a free-from curve fit to the contour.

22. The method of claim 15 wherein the geometric information includes information regarding a path connecting corresponding points on cross-sectional contours of the object.

23. The method of claim 22 wherein the path is at least partially formed by edges of polygons.

24. The method of claim 23 wherein the information of the path includes a free-form curve equation whose control points are vertices of polygons related to the path.

25. An object data converting method wherein data based on topological modeling using topological information of an object is obtained and the data is converted into polygon data by noting description of the object in the modeling, wherein the description includes an equation representing a surface of the object in a parametric manner and a vertex of a polygon is defined by discretely assigning a value to the parameter.

26. A data converting method wherein three dimensional polygon data representing the shape of an object is converted into surface data by studying a topological structure of the object, wherein the topological structure includes information regarding a singular point which is determined when a Morse function is defined on the object.

27. An object structure graph generating apparatus comprising:
   a unit for inputting polygon data representing a shape of an object; and
   a unit for generating a skeleton graph of the object by extracting topological information of the object from the polygon data, wherein the topological information includes information regarding a singular point which is determined when a Morse function is defined on the object.

28. The apparatus of claim 27 wherein the unit for generating a skeleton graph comprises;
   a unit for setting a Morse function to the polygon data;
   a unit for detecting a singular point of the Morse function; and
   a unit for obtaining connection information between the detected singular points.

29. An object data converting apparatus comprising:
   a unit for inputting polygon data representing the shape of an object;
   a unit for generating a skeleton graph of the object by extracting topological information of the object from the input polygon data, wherein the topological information includes information regarding a singular point which is determined when a Morse function is defined on the object; and
   a unit for obtaining contour information of a cross section of the object from the input polygon data.

30. The apparatus of claim 29 wherein the unit for converting the data into polygon data comprises:
   a unit for extracting elements for composing a surface of the object by analyzing the structure of the input data; and
   a unit for discretely defining vertices of polygons on the surface restored from the element.

31. An object data converting system comprising:
   a unit for converting polygon data representing a shape of an object into data based on topological modeling, wherein the topological modeling includes information regarding a singular point which is determined when a Morse function is defined on the object;
   a unit for storing the data obtained by the conversion; and
   a unit for reading the stored data and transforming the data into polygon data by analyzing the structure of the data.

32. The system of claim 31 further comprising a unit for specifying the number of polygons to be obtained through transformation into polygon data, wherein the unit for transforming the data into polygon data generates polygons based on the specification.

33. The system of claim 31 further comprising a unit for specifying the object whose data should be transformed, wherein the unit for transforming the data into polygon data inverts the data of the specified object.

34. The system of claim 31 wherein the system is a server-client system, the server and the client having a respective communication unit, and data based on topological modeling of an object is transmitted from the server to the client when the client requests the data of the object.

35. The system of claim 34 wherein the unit for transforming data into polygon data is installed within the client and the data based on the topological modeling transmitted to the client is inverted into polygon data within the client.

36. A computer-readable medium having stored thereon instructions which, when executed by a processor, cause the processor to perform the steps of:
   extracting topological information regarding an object from polygon data representing a shape of the object, wherein the topological information includes information regarding a singular point which is determined when a Morse function is defined on the object; and
   converting the polygon data into data based on topological modeling using the topological information.

37. A computer-readable medium having stored thereon instructions which, when executed by a processor, cause the processor to perform the steps of:
   obtaining data based on topological modeling using topological information of an object, wherein the topological information includes information regarding a singular point which is determined when a Morse function is defined on the object; and
   transforming the data into polygon data by analyzing description of the object in the modeling.

* * * * *